US007653564B2

(12) United States Patent
Fergusson et al.

(10) Patent No.: US 7,653,564 B2
(45) Date of Patent: Jan. 26, 2010

(54) METHODS AND SYSTEMS FOR PROVIDING A MEASURE OF SUPERVISION OVER THE ACTIVITIES OF REPRESENTATIVES OF A BUSINESS

(75) Inventors: Scott Fergusson, Fort Wayne, IN (US); Tom Rozman, Edina, MN (US)

(73) Assignee: Investigo Corporation, Edina, MN (US)

( * ) Notice: Subject to any disclaimer, the term of this patent is extended or adjusted under 35 U.S.C. 154(b) by 1918 days.

(21) Appl. No.: 09/917,447

(22) Filed: Jul. 27, 2001

(65) Prior Publication Data

US 2003/0023477 A1   Jan. 30, 2003

(51) Int. Cl.
  *G06F 17/50*   (2006.01)
(52) U.S. Cl. ............................................ 705/8; 705/37
(58) Field of Classification Search .............. 705/36–37, 705/7, 11, 8
  See application file for complete search history.

(56) References Cited

U.S. PATENT DOCUMENTS

| | | | | | |
|---|---|---|---|---|---|
| 5,038,284 | A | * | 8/1991 | Kramer | 705/37 |
| 5,818,907 | A | * | 10/1998 | Maloney et al. | 379/32.01 |
| 5,826,243 | A | | 10/1998 | Musmanno et al. | 705/35 |
| 5,930,764 | A | | 7/1999 | Melchione et al. | 705/10 |
| 5,940,809 | A | * | 8/1999 | Musmanno et al. | 705/35 |
| 5,978,779 | A | | 11/1999 | Stein et al. | 705/37 |
| 6,076,072 | A | | 6/2000 | Libman | 705/34 |
| 6,122,635 | A | | 9/2000 | Burakoff et al. | 707/102 |
| 6,233,566 | B1 | * | 5/2001 | Levine et al. | 705/36 R |
| 6,247,000 | B1 | * | 6/2001 | Hawkins et al. | 705/37 |
| 6,405,204 | B1 | * | 6/2002 | Baker et al. | 705/36 R |
| 6,529,725 | B1 | * | 3/2003 | Joao et al. | 455/406 |
| 6,947,902 | B2 | * | 9/2005 | Shah et al. | 705/26 |
| 2001/0034655 | A1 | * | 10/2001 | Donlavage et al. | 705/19 |
| 2002/0026328 | A1 | * | 2/2002 | Westerkamp et al. | 705/2 |
| 2002/0026404 | A1 | * | 2/2002 | Thompson | 705/37 |
| 2002/0032640 | A1 | * | 3/2002 | LaFore et al. | 705/37 |
| 2002/0038235 | A1 | * | 3/2002 | Musafia et al. | 705/11 |
| 2002/0046049 | A1 | * | 4/2002 | Siegel et al. | 705/1 |
| 2002/0055853 | A1 | * | 5/2002 | Macleod Beck et al. | 705/1 |
| 2002/0087383 | A1 | * | 7/2002 | Cogger et al. | 705/10 |
| 2002/0099578 | A1 | * | 7/2002 | Eicher et al. | 705/7 |
| 2002/0138296 | A1 | * | 9/2002 | Holmes, Jr. | 705/1 |
| 2002/0174043 | A1 | * | 11/2002 | Gilbert et al. | 705/35 |
| 2002/0198824 | A1 | * | 12/2002 | Cook | 705/38 |
| 2003/0018557 | A1 | * | 1/2003 | Gilbert et al. | 705/36 |

(Continued)

OTHER PUBLICATIONS

"Special Edition Using Microsoft Excel 97" by Ron Person, Que Publishing, Dec. 17, 1996.*

(Continued)

*Primary Examiner*—Romain Jeanty
(74) *Attorney, Agent, or Firm*—Greenberg Traurig, LLP

(57) ABSTRACT

Systems and methods are provided for helping businesses provide a measure of supervision over the activities of their representatives without requiring a significant amount of manual data sorting and/or cross-correlation. This is accomplished by providing a database in which each representative records his/her activities. Predefined reports are then run against the database, preferably at preset intervals, which identify potentially unacceptable activity. The reports generate one or more alerts that flag the unacceptable activity, and each alert is reviewed and/or investigated as desired. The systems and methods preferably are arranged to be consistent with industry hierarchies, allowing each supervisor in the hierarchy to maintain unique report parameters.

25 Claims, 22 Drawing Sheets

U.S. PATENT DOCUMENTS

| | | | | |
|---|---|---|---|---|
| 2003/0105692 | A1* | 6/2003 | Gilbert et al. | 705/35 |
| 2004/0158524 | A1* | 8/2004 | Anderson et al. | 705/42 |
| 2004/0162773 | A1* | 8/2004 | Del Rey et al. | 705/36 |
| 2005/0273361 | A1* | 12/2005 | Busch | 705/2 |

OTHER PUBLICATIONS

Rose et al (How can CPAs can help spot when client investments are being mishandled), Oct. 1996, Journal of Accountancy, pp. 63-67.*

Dialog (Penny Stock Disclosure Rules), Apr. 1992, Security and Exchange Commission, Dialog file 180, Accession No. 02251552, pp. 1-112.*

Schultz et al (The Ethics of Business Intelligence) disclose the concept of unacceptable activities of employees), Journal of Business Ethics, 1994. pp. 305-314.*

Nancy R. Mandell, "Online Compliance Help Arrives", *On Wall Street*, Sep. 2001, p. 43.

http://www.portfolioaudit.com/navigatorcg/corpNewsDetail. asp?id=23, "Corporate News-North American Software to Integrate Navigator Consulting Group's Compliance Solution", downloaded Sep. 25, 2001, 2 pages.

http://www.portfolioaudit.com/navigatorcg/corpNewsDetail. asp?id=15, "Corporate News-Navigator Consulting Group Announces portfolioAudit.com Web Site", downloaded Sep. 25, 2001, 1 page.

http://www.portfolioaudit.com/navigatorcg/corpNewsDetail. asp?id=21, "Corporate News-Navigator Consulting Group, Inc. and DataCow of Toronto Announce Development of Portfolio R.A.M. (Research Auditing & Monitor) Software", downloaded Sep. 25, 2001, 2 pages.

http://www.portfolioaudit.com/navigatorcg/corpNewsDetail. asp?id=47, "Corporate News-Portfolio R.A.M. Software Now Available On-Line", downloaded Sep. 25, 2001, 1 page.

http://www.portfolioaudit.com/navigatorcg/corpNewsDetail. asp?id=46, "Corporate News-Navigator Consulting Group Releases brokerAudit Application", downloaded Sep. 25, 2001, 1 page.

http://www.portfolioaudit.com/navigatorcg/corpNewsDetail. asp?id=48, "Corporate News-Securities North America/Complinet Reviews BrokerAudit", downloaded Sep. 25, 2001, 2 pages.

http://www.portfolioaudit.com/navigatorcg/corpNewsDetail. asp?id=52, "Corporate News-MJK Clearing, Inc. and Protegent, Inc. Announce Alliance to offer BrokerAudit™ to MJK Correspondent Broker-Dealers", downloaded Sep. 25, 2001, 2 pages.

http://www.brokeraudit.com/brokeraudit/pubilc/aboutbroker.asp, "BrokerAudit: About US-Highlights", downloaded Sep. 25, 2001, 3 pages.

http://www.mantas.com/solutions/equ_trd_comp.html, "The Mantas Equities Trading Compliance", downloaded Sep. 25, 2001, 2 pages.

http://www.siliconphilly.com/newletters/ar3_6_5.htm, "Mantas, Inc., Announces Funding and Management Team", downloaded Sep. 25, 2001, 7 pages.

http://www.mantas.com/solutions/solutions_advantage.html, "The Mantas Advantage" downloaded Sep. 25, 2001, 1 page.

http://www.mantas.com/solutions/best_execution.html, "Mantas Best Execution", downloaded Sep. 25, 2001, 2 pages.

http://www.mantas.com/solutions/fraud_ml_sec_firms.html, "Fraud and Money Laundering Detection for Securities Firms", downloaded Sep. 25, 2001, 2 pages.

http://www.mantas.com/solutions/solutions_faq.html, "Frequently Asked Questions", downloaded Sep. 25, 2001, 5 pages.

http://www.mantas.com/solutions/solutions_knowledge_disc. html, "The Mantas Knowledge Discovery Platform", downloaded Sep. 25, 2001, 2 pages.

http://www.investrack.com, "Freedom Track, Inc.", downloaded Apr. 30, 2001, 2 pages.

http://www.investrack.com/FT3k_Home.htm, "Freedom Track 3000", downloaded Apr. 30, 2001, 2 pages.

http://www.investrack.com/bd_ria_oversight.htm, "BD RIA Oversight", downloaded Apr. 30, 2001, 2 pages.

http://www.investrack.com/bd_back_office.htm, "BD Back Office", downloaded Apr. 30, 2001, 2 pages.

http://www.investrack.com/ft3k_3rd_generation.htm, "FT3k $3^{rd}$ Generation", downloaded Apr. 30, 2001, 2 pages.

http://www.sungardss.com/ "SunGard Securities Systems-Home Page", downloaded Apr. 30, 2001, 1 page.

http://www.sungardss.com/html/products.htm, "SunGard Securities Systems, Products", downloaded Apr. 30, 2001, 2 pages.

http://www.sungardss.com/html/eindrad1html, "EinTrader.com-The First Eback-Office Connection", downloaded Apr. 30, 2001, 2 pages.

http://www.sungardss.com/html/p_i_bo.htm, "InTrader-Back Office", downloaded Apr. 30, 2001, 3 pages.

http://www.sungardss.com/htmlp_i_st.htm, "InTrader-Software and Technology", downloaded Apr. 30, 2001, 2 pages.

http://www.sungardss.com/html/p_it_iv.htm, "InTrader-Investment Portfolio", downloaded Apr. 30, 2001, 3 pages.

http://www.sungardss.com/html/p_scs.htm, "SunGard Correspondent Services", downloaded Apr. 30, 2001, 2 pages.

http://www.sungardss.com/html/p_fitrac.htm, "FiTrac for InTrader and BOLT", downloaded Apr. 30, 2001, 2 pages.

http://www.sungardss.com/html/p_ssn.htm, "SunGard Solutions Network (SSN)", downloaded Apr. 30, 2001, 2 pages.

http://www.sungardss.com/html/p_exrpt.htm, "Investment Portfolio-Executive Reporting", downloaded Apr. 30, 2001, 2 pages.

http://www.sungardss.com/html/p_i_fo.htm, "InTrader-Front Office", downloaded Apr. 30, 2001, 3 pages.

http://www.sungardss.com/html/p_i_bd.htm, "InTrader-Broker-Dealer", downloaded Apr. 30, 2001, 3 pages.

http://www.sungardss.com/html/p_i_aa.htm, "InTrader-Alerts and Alarms", downloaded Apr. 30, 2001, 3 pages.

http://www.sungardss.com/html/n_innet.htm, "SunGard Securities System" downloaded Apr. 30, 2001, 1 page.

http://www.sungardss.com/html/p_i_rsm.htm, "InTrader-Remote Systems Management", downloaded Apr. 30, 2001, 2 pages.

http://www.sungardss.com/html/p_ipnet.htm, "SunGard Securities Systems-InTrader Investment Portfolio Services", downloaded Apr. 30, 2001, 2 pages.

http://www.sungardss.com/p_bt_ovr.htm, "BOLT-Overview", downloaded Apr. 30, 2001, 3 pages.

http://www.sungardss.com/html/p_bt_iv.htm, "BOLT-Investment Portfolio", downloaded Apr. 30, 2001, 2 pages.

http://www.sungardss.com/html/p_aps.htm, "SunGard Securities Systems-APS 2", downloaded Apr. 30, 2001, 4 pages.

http://www.advisortoday.com/archives/2001_february_mm.html, Janet C. Arrowood, "Managing Money: Taking the Sting out of an Audit", Feb. 2001, 3 pages.

http://www.finop.com/main.htm, "The FINOP Companies Home Page", downloaded Apr. 30, 2001, 2 pages.

http://www.finop.com/a.htm, "Historical Perspective—The FINOP Companies", downloaded Apr. 30, 2001, 4 pages.

http://www.finop.com/product.htm, "National FINOP, Inc.—A Product Description", downloaded Apr. 30, 2001, 1 page.

http://www.finop.com/tourmenu.htm, "FINOP Software 'Tour Menu'", downloaded Apr. 30, 2001, 1 page.

http://www.finop.com/m1.htm, "Access Current Period Trade Processing Files and Reports", downloaded Apr. 30, 2001, 1 page.

http://www.finop.com/m1-a.htm, "Access Trade Processing and Error Reports", downloaded Apr. 30, 2001, 1 page.

http://www.finop.com/m1-a1.htm, "Conventional 'Commissioned Based' Trade Processing", downloaded Apr. 30, 2001, 1 page.

http://www.finop.com/m1-a2.htm, "Process Direct Mutual Fund and Similar Trades:", downloaded Apr. 30, 2001, 1 page.

http://www.finop.com/m1-b.htm, "Trade Status an Error Reports", downloaded Apr. 30, 2001, 1 page.

httn://www.finop.com/m1-c.htm, "Error Edit", downloaded Apr. 30, 2001, 1 page.

http://www.finop.com/m2.htm, "Access Current Period Principal (House) and K2I Blotters", downloaded Apr. 30, 2001, 1 page.

http://www.finop.com/m2-a.htm, "Principal Trade Blotters", downloaded Apr. 30, 2001, 1 page.

http://www.finop.com/m2.b.htm, "Principal Trade Blotters", downloaded Apr. 30, 2001, 1 page.

http://www.finop.com/m3.htm, "Access Agency and Riskless Blotters and Reports", downloaded Apr. 30, 2001, 1 page.
http://www.finop.com/m3-a.htm, "Access Agency and Riskless Blotters and Reports", downloaded Apr. 30, 2001, 1 page.
http://www.finop.com/m3-b.htm, "Access Agency and Riskless Blotter and Reports", downloaded Apr. 30, 2001, 1 page.
http://www.finop.com/m3-c.htm, "Access Agency and Riskless Blotter and Reports", downloaded Apr. 30, 2001, 1 page.
http://www.finop.com/m4.htm, "Access Underwriting Files and Reports", downloaded Apr. 30, 2001, 1 page.
http://www.finop.com/m4-a.htm, "Access Underwriting Files and Reports", downloaded Apr. 30, 2001, 1 page.
http://www.finop.com/m4-b.htm, "Access Underwriting Files and Reports", downloaded Apr. 30, 2001, 1 page.
http://www.finop.com/m4-c.htm, "Access Underwriting Files and Reports", downloaded Apr. 30, 2001, 1 page.
http://www.finop.com/m5.htm, "Access Reports From History", downloaded Apr. 30, 2001, 1 page.
http://www.finop.com/m5-a.htm, "Access Reports From History", downloaded Apr. 30, 2001, 1 page.
http://www.finop.com/m5-b.htm, "Access Reports From History", downloaded Apr. 30, 2001, 1 page.
http://www.finop.com/m5-c.htm, "Access Reports From History", downloaded Apr. 30, 2001, 1 page.
http://www.finop.com/m6.htm, "Access System 'Set-Up' Files and Reports", downloaded Apr. 30, 2001, 1 page.
http://www.finop.com/m6-a.htm, "Access System 'Set-Up' Files and Reports", downloaded Apr. 30, 2001, 1 page.
http://www.finop.com/m6-b.htm, "Access Reports From History", downloaded Apr. 30, 2001, 1 page.
http://www.finop.com/m6-c.htm, "Access Reports From History", downloaded Apr. 30, 2001, 1 page.
http://www.finop.com/m8.htm, "Special Applications and User Reports", downloaded Apr. 30, 2001, 1 page.
http://www.finop.com/m10.htm, "Delete Settled Transactions and Append to History", downloaded Apr. 30, 2001, 1 page.
http://www.finop.com/consult.htm, "FINOP Consulting Page", downloaded Apr. 30, 2001, 1 page.

* cited by examiner

Investigo Corp.

Compliance --
Symbol: [  ] Go | Daily                Account Number or Name: [           ] Lookup      4/27/2001

Trade Entry

JDEMO    Joseph Client -- IRA Rollover

| | | | |
|---|---|---|---|
| Trade Date | 4/27/2001 | Trade Type | Buy |
| Amount | 1000 | Symbol or CUSIP | INTERNATIONAL BUSINESS MACHINES COR (IBM) |
| Price | 33 | Solicitation Status | Solicited |
| Commission | $600.00 | Location of Shares | Long |
| Fees and/or charges | $65.00 | Reinvest | None |
| Sales charge | 0 | | |
| Total Fees | $665.00 | | |
| Total Cost | $33,665.00 | | |
| Order Entered By | 3br | | |
| Notes | Recommended to client | | |

[Execute this Buy Order] — 272

*FIG. 7*

Investigo Corp.

Trade Buy Blotter for All for dates 10/1/2000 to 10/31/2000

| Trade Date | Settle Date | Buy / Sell | Account Number | Product | Shares | S/UNS | Buy Price | Buy Cost | Buy Commission |
|---|---|---|---|---|---|---|---|---|---|
| 10/1/2000 | 10/4/2000 | Buy | W632293452 | C017254-0D | 60327.84 | Unsolicited | 1 | 0 | 0 |
| 10/2/2000 | 10/5/2000 | Buy | W632669420 | ALAX | 3603.604 | Solicited | 15.54 | 56000 | 0 |
| 10/2/2000 | 10/5/2000 | Buy | W632669420 | DGSX | 1689.708 | Solicited | 13.02 | 22000 | 0 |
| 10/2/2000 | 10/5/2000 | Buy | W632669420 | RCVAX | 1756.44 | Solicited | 17.08 | 30000 | 0 |
| 10/2/2000 | 10/5/2000 | Buy | W632657669 | LEIFX | 0.194 | Solicited | 22.5 | 0 | 0 |
| 10/2/2000 | 10/5/2000 | Buy | W632656626 | RCVAX | 51.317 | Solicited | 16.58 | 0 | 0 |
| 10/2/2000 | 10/5/2000 | Buy | W632658655 | RCVBX | 11.881 | Solicited | 16.61 | 0 | 0 |
| 10/2/2000 | 10/5/2000 | Buy | W632588893 | RCVGX | 7.324 | Solicited | 16.57 | 0 | 0 |
| 10/2/2000 | 10/5/2000 | Buy | W632541066 | BETM | 300 | Solicited | 0.4375 | 187.6 | 50 |
| 10/2/2000 | 10/5/2000 | Buy | W632498077 | LEIBX | 0.135 | Solicited | 22.5 | 0 | 0 |
| 10/2/2000 | 10/5/2000 | Buy | W632467411 | QQQ | 70 | Solicited | 88.5 | 6333.44 | 132.09 |
| 10/2/2000 | 10/5/2000 | Buy | W632448502 | RCVGX | 16.242 | Solicited | 16.57 | 0 | 0 |
| 10/2/2000 | 10/5/2000 | Buy | W636047672 | RCVGX | 47.063 | Solicited | 16.57 | 0 | 0 |
| 10/2/2000 | 10/5/2000 | Buy | W632367389 | RCVBX | 21.917 | Solicited | 16.61 | 0 | 0 |
| 10/2/2000 | 10/5/2000 | Buy | W632669420 | OPPAX | 485.784 | Solicited | 69.99 | 34000 | 0 |
| 10/2/2000 | 10/5/2000 | Buy | W632366945 | LEIFX | 1.342 | Solicited | 22.5 | 0 | 0 |
| 10/2/2000 | 10/5/2000 | Buy | W632322475 | RCVAX | 40.796 | Solicited | 16.58 | 0 | 0 |
| 10/2/2000 | 10/5/2000 | Buy | W632312666 | AHITX | 3.706 | Solicited | 12.97 | 0 | 0 |
| 10/2/2000 | 10/5/2000 | Buy | W632306858 | NABGX | 13.93 | Solicited | 15.04 | 0 | 0 |
| 10/2/2000 | 10/5/2000 | Buy | W632297412 | LEIBX | 0.292 | Solicited | 22.5 | 0 | 0 |
| 10/2/2000 | 10/5/2000 | Buy | W632297347 | LEIBX | 0.576 | Solicited | 22.5 | 0 | 0 |
| 10/2/2000 | 10/5/2000 | Buy | W632297107 | KO | 0.62 | Solicited | 54.937 | 34.22 | 0 |
| 10/2/2000 | 10/5/2000 | Buy | W632295523 | FDBBX | 17.202 | Solicited | 8.79 | 0 | 0 |

*FIG. 8*

Investigo Corp.

- Daily Trade Tickets for the Period 10/1/2000 to 10/31/2000 for All.

| Trade Date | Settle Date | Buy/Sell | Account Number | Product | Shares | S/UNS | Type | Price | Report | Rep |
|---|---|---|---|---|---|---|---|---|---|---|
| 10/2/2000 | 10/5/2000 | Buy | W632669420 | 45168H105 | 2001.8200 | Solicited | Cash-01 | market | 10.99 | 3AX |
| 10/2/2000 | 10/5/2000 | Sell | W632319364 | RHAT | 500 | Unsolicited | Cash-01 | mkt | 17 1/16 | 3BR |
| 10/2/2000 | 10/5/2000 | Buy | W632467411 | QQQ | 70 | Unsolicited | Cash-01 | 88 1/2 gtc | 88 1/2 | 3BR |
| 10/2/2000 | 10/5/2000 | Sell | W632319364 | NOIZ | 600 | Unsolicited | Cash-01 | mkt | 7 1/16 | 3BR |
| 10/2/2000 | 10/5/2000 | Buy | W632341066 | BETM | 300 | Unsolicited | Cash-01 | market | 43.75 | 3AX |
| 10/2/2000 | 10/5/2000 | Sell | W632319364 | TRCR | 800 | Unsolicited | Cash-01 | 3 11/16 | | 3BR |
| 10/2/2000 | 10/5/2000 | Buy | W632669420 | IALAX | 3603.6040 | Solicited | Cash-01 | market | 15.54 | 3AX |
| 10/2/2000 | 10/5/2000 | Buy | W632669420 | 45163C437 | 1689.7080 | Solicited | Cash-01 | market | 13.02 | 3AX |
| 10/2/2000 | 10/5/2000 | Buy | W632669420 | OIGAX | 419.3150 | Solicited | Cash-01 | 0 | 23.82 | 3AX |
| 10/2/2000 | 10/5/2000 | Buy | W632669420 | OPMSX | 1635.2200 | Unsolicited | Cash-01 | market | 15.90 | 3AX |
| 10/2/2000 | 10/6/2000 | Buy | W630047672 | ANWFX | 2471.6500 | Solicited | Cash-01 | market | 29.63 | 3AX |
| 10/3/2000 | 10/6/2000 | Buy | W630047672 | AEPGX | 1380.8760 | Solicited | Cash-01 | market | 39.48 | 3AX |
| 10/3/2000 | 10/6/2000 | Sell | W630047672 | IVINX | 1707.1350 | Solicited | Cash-01 | market | 36.68 | 3AX |
| 10/3/2000 | 10/6/2000 | Sell | W630047672 | 220714505 | 5274.570 | Solicited | Cash-01 | 1 | 1 | 3AX |
| 10/3/2000 | 10/6/2000 | Buy | W632669420 | RCYAX | 1756.4400 | Solicited | Cash-01 | market | 17.08 | 3AX |
| 10/3/2000 | 10/6/2000 | Buy | W632669420 | OPPAX | 4857840 | Solicited | Cash-01 | market | 69.99 | 3AX |
| 10/3/2000 | 10/6/2000 | Sell | W630047672 | NEFDX | 4282.7230 | Solicited | Cash-01 | market | 17.10 | 3AX |
| 10/3/2000 | 10/6/2000 | Buy | W636020430 | LU | 100 | Unsolicited | Cash-01 | 30.25 | GTC | 3AX |
| 10/3/2000 | 10/6/2000 | Sell | W632295424 | LEH | 1000 | Unsolicited | Cash-01 | 160 | GTC | 3AX |
| 10/3/2000 | 10/7/2000 | Sell | W636020505 | FKINX | 7884.0490 | Solicited | Cash-01 | market | 2.31 | 3AX |

Investigo Corp. 5/8/2001

SmartKnob settings

■ Margin Balance vs Equity

Use this report to monitor Margin balances versus equity with or without Discretionary Agreements

| Description | Setting | Guide | Update |
|---|---|---|---|
| Percentage (vs. Total) | 25 | Enter as a number between 0 and 100 as a percent | Update |
| Discretionary Agreement? | ☑ | Yes / No | Update |

Close Window

FIG. 18

METHODS AND SYSTEMS FOR PROVIDING A MEASURE OF SUPERVISION OVER THE ACTIVITIES OF REPRESENTATIVES OF A BUSINESS

CROSS-REFERENCE TO CO-PENDING PATENT APPLICATIONS

This Application is related to co-pending U.S. patent application Ser. No. 09/917,120, filed Jul. 27, 2001, entitled "Methods and Systems for Assisting Financial Services Firms and Their Representatives" and U.S. patent application Ser. No. 09/916,951, filed Jul. 27, 2001, entitled "Methods and Systems for Monitoring the Efficacy of a Marketing Project", both of which are incorporated herein by reference.

FIELD OF THE INVENTION

The present invention generally relates to systems and methods for operating a business, and more particularly, to methods and systems for providing a measure of supervision over representatives of a business.

BACKGROUND OF THE INVENTION

Representatives are often used to market and/or provide products and services to the customers of a business. Such representatives include, for example, sales representatives, customer support representatives, etc. In some industries, such as the financial service, insurance, and real estate industries, many of the representatives are licensed by an applicable authority. Brokers, insurance agents and real estate agents are just a few examples of such representatives.

Licensed representatives are often subject to a variety of rules and regulations, which if not followed, may result in suspension or revocation of the representatives license and/or potential liability for the representative and the representative's firm. For example, in the financial service industry, brokers are typically subject to rules and regulations from a variety of regulatory agencies including, for example, the Securities and Exchange Commission ("SEC"), the Federal Reserve, the various self-regulatory organizations ("SRO"), such as the National Association of Securities Dealers ("NASD") and the New York Stock Exchange ("NYSE"), as well as the Securities Commission in every state where the broker or his firm has customers, has an office, or solicits prospective customers.

For a variety of reasons, many businesses attempt to provide some measure of supervision over the activities of their representatives. Many financial services firms, for example, have a designated supervisor or supervisory group tasked with the responsibility of monitoring the activities of the firm's representatives. While such a supervisory function is desirable, it is often difficult to achieve in practice. To supervise the activities of even a few representatives, for example, the supervisor must often review data from several different sources such as trade tickets, customer related information such as age, customer account activity, etc., and cross-correlate the information manually to determine if the activities of the representatives are in compliance with the applicable rules or standards.

To illustrate the difficulty faced by many supervisors in financial services firms, assume the supervisor wishes to detect unwanted activities relative to older customers. In one example, assume that the supervisor merely wishes to determine if any of the accounts of older customers (e.g. over 65 years of age) have executed more than 5 transactions in any given month. If an older customer account is identified as having more than 5 transactions, the supervisor may wish to follow up with the representative and/or the customer to ensure that the customer's best interests are being met. However, to identify if any of the firm's older customers have executed more than 5 transactions in any given month, the supervisor must often flag each account of the firm that has more than 5 transactions for a given month, and then determine if any of the flagged accounts correspond to older customers (e.g. over 65 years of age). For a firm that has even a few representatives, this task can be difficult, time consuming, and tedious. Similar situations often can occur with other types of firms, such as banks, insurance firms, real estate firms, etc.

What would be desirable, therefore, is a proactive and reactive method and system for helping a firm provide a measure of supervision over the activities of its representatives without requiring a significant amount of manual data sorting and/or cross-correlation.

SUMMARY OF THE INVENTION

The present invention provides methods and systems for helping a business to provide a measure of supervision over the activities of its representatives without requiring a significant amount of manual data sorting and/or cross-correlation. In one illustrative embodiment, this is accomplished by providing a database where each representative records his/her daily activities. For example, in a financial services firm, each representative records his or her activities in a database throughout the course of each day. These activities may be recorded through trade records, current and historical contact records, check deposits, margin balance, etc. The representative may also record personal information about each of his or her customers, including such things as age, investment objective, etc.

To provide a measure of supervision over the activities of the representatives, a number of rules and procedures as well as reports may be defined and/or generated. These rules, procedures and reports may come predefined from a software vendor, and/or they may be defined by a supervisor or supervising group within a firm. Each report may define one or more actual or potentially unacceptable activity using one or more unacceptable activity parameters. In a preferred embodiment, some or all of the unacceptable activity parameters are changeable by the supervisor or supervising group at a later date, such as before each report is run. This may give the supervisor added flexibility in defining and identifying unacceptable activity both proactively and reactively within the firm.

Once defined, each report is preferably run against the database to compare the unacceptable activity parameters defined in the reports against the recorded activities in the database. It is contemplated the all or some of the reports may be run against the database when, for example, prompted by a user, when a particular function is used by a user such as a stock buy function, and/or in a batch mode at any frequency interval desired up to and including real or near real time.

Running the reports against the database preferably produces a listing of alerts. Each alert may identifies an activity that falls within the unacceptable activity parameters defined in the reports. The listing of alerts may be stored in the database for later reference, if desired. From the listing of alerts, the supervisor or supervising group may perform appropriate follow up activity. The follow up activity may also be recorded in the database for later reference.

Rather than defining one or more actual or potentially unacceptable activities using the unacceptable activity parameters discussed above, it is contemplated that the reports may include one or more acceptable activity parameters. Once defined, each report may then be run against the database to compare the acceptable activity parameters against the recorded activities in the database. Like above, a listing of alerts may be generated and displayed, each identifying only those activities recorded in the database that fall outside of the acceptable activity parameters defined in the reports. From the listing of alerts, the supervisor or supervising group may perform and record the appropriate follow up activity.

BRIEF DESCRIPTION OF THE DRAWINGS

FIG. 5 is a screen shot showing the illustrative window of FIG. 4 with the trade menu expanded;

FIG. 6 is a screen shot showing an illustrative window that may be displayed after the "Buy" menu option is selected from the trade menu 262 of FIG. 5;

FIG. 7 is a screen shot showing an illustrative window that may be displayed after the "Confirm This Trade" button of FIG. 6 is selected;

FIG. 8 is an illustrative screen shot showing an illustrative Trade Buy Blotter for all representatives of a firm;

FIG. 9 is an illustrative screen showing an illustrative Daily Trade Tickets chart for all representatives of a firm;

FIG. 12 is a screen shot showing illustrative parameters for a "Margin Balance versus Equity" report;

FIG. 18 is a screen shot showing an illustrative window that may be displayed when the "3BR" hyperlink under the "Rep" column for the "Equity or Option Trades for Client Date of Birth" alert is selected in FIG. 10;

DETAILED DESCRIPTION OF THE INVENTION

The present invention is described below primarily with respect to Broker Dealer firms. However, the present invention is equally applicable to other financial services firms including banks, insurance companies, consumer finance organizations, wire houses, etc. More generally, however, the present invention is useful in providing a measure of supervision over the activities of representatives of a wide variety of businesses.

Figure 1:
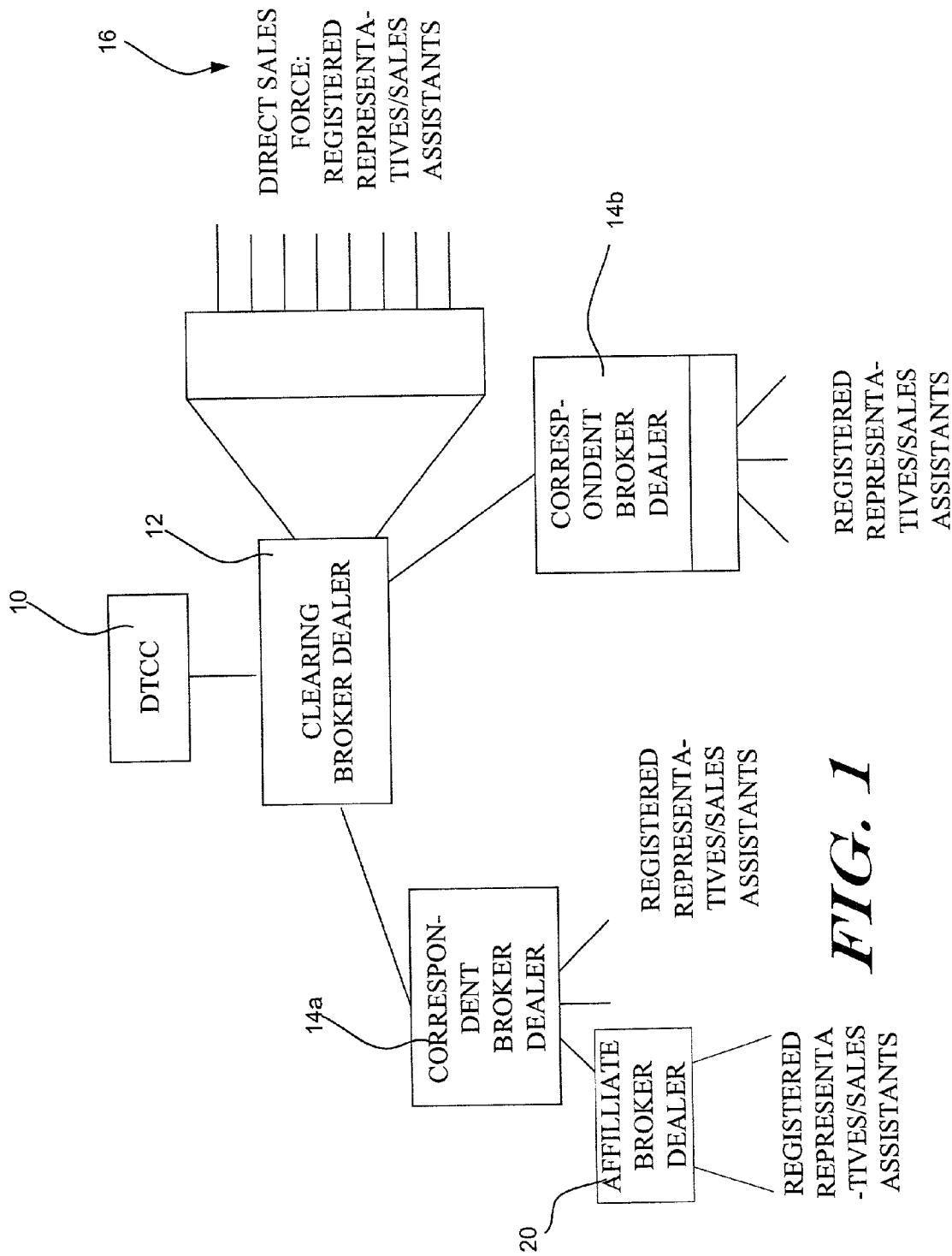
FIG. 1 is a schematic diagram showing the product distribution model commonly used in the financial services industry.

FIG. 1 is a schematic diagram showing the distribution model commonly used in the financial services industry to move investment products. The distribution model often begins with the DTCC (Depository Trust Clearing Corporation—formerly NSCC) 10. The DTCC clears a majority of the investment market's equity, debt and mutual fund trades, and also some industry insurance transactions. Financial services who transact business through the DTCC 10, must either be a Clearing Broker Dealer 12 or a correspondent 14 to a Clearing Broker Dealer. Clearing Broker Dealers 12 generally have systems that facilitate trading with the DTCC 10.

The Clearing Broker Dealers 12 may have their own direct sales force, which often includes registered representatives and sales assistants 16 that sell investment product directly to customers. The Clearing Broker Dealers 12 may also have a number of Correspondent Broker Dealers 14a and 14b. Each Correspondent Broker Dealer 14a and 14b may have a number of registered representatives and sales assistants to sell investment product to their customers. Some of the Correspondent Broker Dealers 14 may have Affiliate Broker Dealers, such as Affiliate Broker Dealer 20, which may also have registered representatives and sales assistants for selling investment product to their customers.

Figure 2:
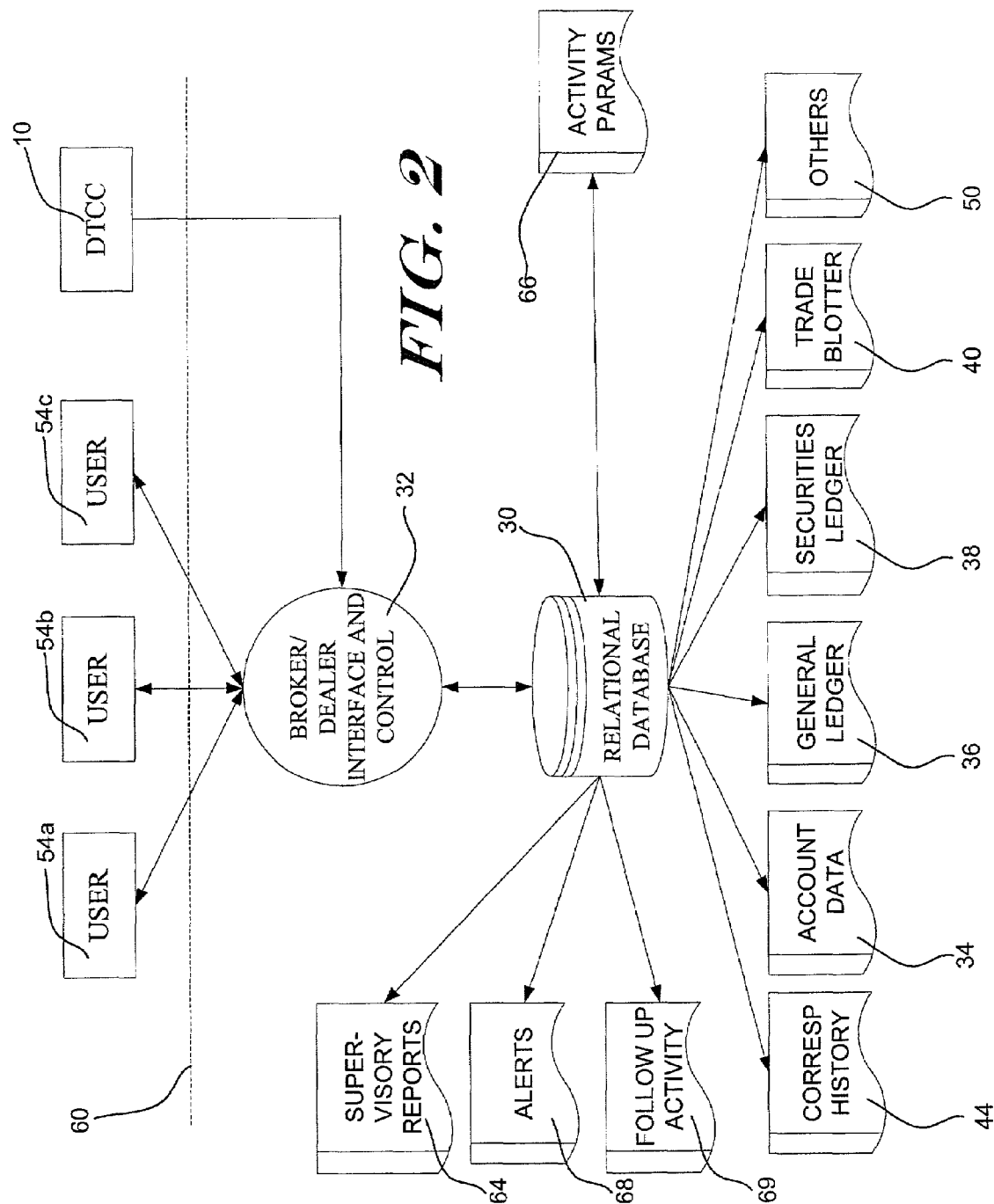
FIG. 2 is a schematic diagram showing the architecture of an illustrative system for helping a business provide a measure of supervision over the activities of its representatives without requiring a significant amount of manual data sorting and/or cross-correlation.

FIG. 2 is a schematic diagram showing the architecture of an illustrative system for helping a business provide a measure of supervision over the activities of its representatives without requiring a significant amount of manual data sorting and/or cross-correlation. The illustrative system is used in conjunction with financial services firms such as Clearing Broker Dealers 12, Correspondent Broker Dealers 14a and 14b, Affiliate Broker Dealers 20 (see FIG. 1), or other financial services firms such as banks, insurance companies, consumer finance organizations, wire houses, etc.

The illustrative system uses a database 30, which is preferably a relational database such as a Microsoft Access®, Microsoft SQL Server 2000®, Oracle 9i®, etc. In some embodiments, the system may also access other databases. Multiple local and/or remote databases may be used by the system, if desired.

A broker/dealer interface and control block 32 provides an interface between the database 30 and the users 54A, 54B, and 54C of the system. The users 54A, 54B, and 54C may be any type of user, but in the illustrative embodiment, are registered representatives and/or sales assistants. In a preferred embodiment, the broker/dealer interfacing control block 32 and relational database 30 operate on a server connected to a number of client systems through the World Wide Web (WWW). The users 54A, 54B and 54C then access the broker/dealer interface and control block 32 from the client systems, as is shown by dashed line 60. The server functions are shown below dashed line 60, while the client functions are shown above dashed line 60.

While the preferred embodiment allows the users 54A, 54B and 54C to access the broker/dealer interface and control block 32 via the internet, other embodiments are contemplated including allowing the users 54A, 54B and 54C to access the broker/dealer interface control block 32 through an intranet, a LAN, a direct connection, or any other connection mechanism or means. To receive pricing data and to clear trades, the broker/dealer interface and control block 32 may be connected to the DTCC 10 and/or other services. It is contemplated that these connections may also be via the internet, an intranet, a LAN, a direct connection, or any other connection means.

The relational database 30 may include a number of data files (or entries) to support the activities of users 54A, 54B and 54C. Some illustrative data files (or entries) include customer account data 34, general ledger data 36, securities ledger data 38, trade blotter data 40, customer correspondence history logs 44, and others 50. The account data file 34 preferably identifies each customer account, and the contents of each account. A customer account may include, for example, a customer account number, current and past holdings of the account, investment objectives of the account, personal information about the customer including the customer's name, address, interests, etc.

The general ledger data file 36 preferably stores a general ledger for the broker dealer firm. The securities ledger 38 preferable records each buy and sell executed by representatives of the broker dealer firm. The trade blotter data file 40 preferably stores each trade executed by representatives of the broker dealer firm. The correspondence history data file 44 preferably records the correspondence history between each representative and their customers.

As can be seen, the broker/dealer interface and control block 32 provides an interface that helps each of the users 54A, 54B, and 54C record his/her activities in the relational database 30. The users activities are recorded in, for example, the customer account data file 34, general ledger data file 36, securities ledger data file 38, trade blotter data file 40, customer correspondence history logs 44, and others 50.

To provide a measure of supervision over the activities of selected users, a number of supervisory reports may be defined. The supervisory reports, which are preferably also stored in database 30, are shown generally at 64. The reports 64 may be predefined and/or defined by a supervisor or supervising group within a firm. Each report preferably defines one or more actual or potential unacceptable activity by using one or more unacceptable activity parameters. The unacceptable activity parameters are generally shown at 66. In a preferred embodiment, some or all of the unacceptable activity parameters 66 may be changed by the supervisor or supervising group within the firm. This may give the firm added flexibility in defining and identifying unacceptable activity within the firm.

Once defined, each report 64 may be run against the database 30. When each report is run, the unacceptable activity parameters 66 are compared against the recorded activities in the database 30. It is contemplated the all or some of the reports 64 may be run against the database when, for example, prompted by a supervisor or when a representative uses a particular function such as a stock buy function. Alternatively, or in addition, some or all of the reports 64 may be run automatically in a batch mode at some desired frequency interval including up to real or near real time. Under some circumstances, it may be desirable to run some or all of the reports 64 in batch mode during off-peak hours, which may reduce the load on the database 30 during ordinary business hours.

Running the reports 64 against the database 30 may produce a listing of alerts. The listing of alerts are generally shown at 68. Each alert 68 may identify an activity that falls within the unacceptable activity parameters 66 of at least one of the reports 64. The listing of alerts 68 may be stored in the database 30 for reference, if desired. The supervisor or supervising group may quickly identify the activities that are questionable by simply reviewing the alerts. From the listing of alerts 68, the supervisor or supervising group preferably performs appropriate follow up activity. The follow up activity may be recorded in the database 30 for later reference, such as to support subsequent compliance audits by an applicable authority. The recorded follow up activity is generally shown at 69.

Rather than defining one or more actual or potentially unacceptable activity using the unacceptable activity parameters 66, it is contemplated that the reports 64 may define acceptable activity parameters. Once defined, each report 64 may be run against the database 30 to compare the acceptable activity parameters against the recorded activities in the database 30. Like above, a listing of alerts 68 may be generated. However, in this case, each report may identifying those activities that fall outside of the acceptable activity parameters defined in the reports 64.

In most cases, only certain supervisory users are given rights to define and/or run reports on the database 30. For example, and referring to FIG. 2, user 54A may be a designated supervisory user while users 54B and 54C may not. Thus, it may be appropriate for user 54A to have the rights to define and/or run reports on the database 30, while users 54B and 54C may only have the rights to record their activities in the database 30.

Figure 3:
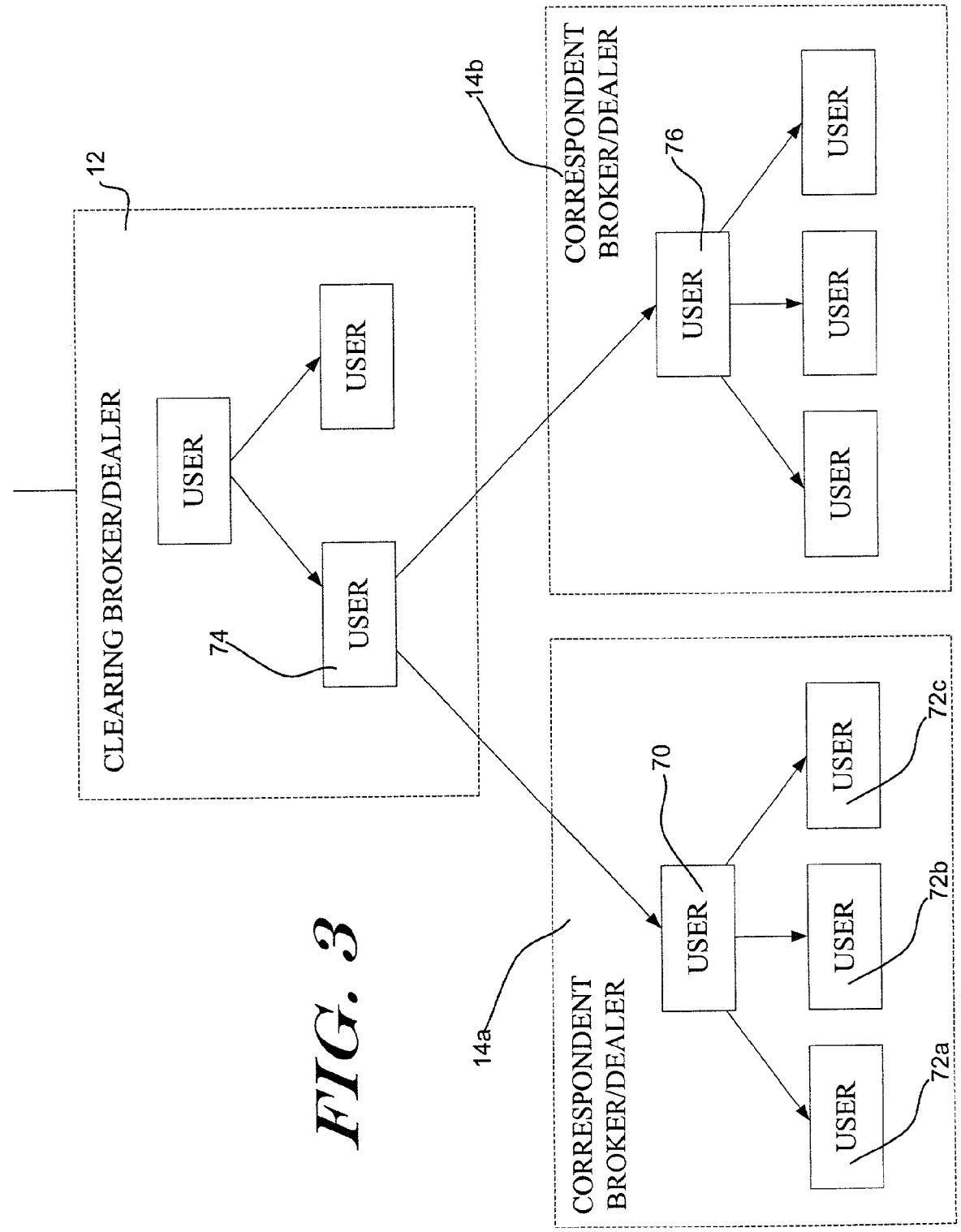
FIG. 3 is a schematic diagram showing an illustrative user hierarchy in accordance with the present invention.

FIG. 3 is a schematic diagram showing an illustrative user hierarchy that may be helpful in defining the supervisory rights in a typical broker dealer firm. In the illustrative embodiment, Clearing Broker Dealer 12 has a first Correspondent Broker Dealers 14a and a second Correspondent Broker Dealers 14b, similar to that shown in FIG. 1. Preferably, representatives from both the Clearing Broker Dealer 12 and the Correspondent Broker Dealers 14a and 14b use the system, and share database 30 (see FIG. 2). When so provided, the various users of the system may be placed, at least conceptually, into a hierarchical tree. Those users placed higher in the hierarchical tree may be given access to the accounts and data of the users lower in the hierarchical tree. For example, user 70 of the first Correspondent Broker Dealers 14a may have access to the accounts and data of users 72a, 72b and 72c. User 70 may be, for example, a representative that manages the first Correspondent Broker Dealers 14a, or otherwise has the responsibility for monitoring the activities of the representatives within the first Correspondent Broker Dealers 14a. Likewise, user 74 of the Clearing Broker Dealer 12 may have access to the accounts and data of users 70, 72a, 72b and 72c of the first Correspondent Broker Dealer 14a, and the users of the second Correspondent Broker Dealers 14b including user 76. User 74 may be, for example, a compliance officer of the Clearing Broker Dealers 12. This user hierarchal structure is preferably achieved by providing an identifier in each user account that identifies those users that are lower (or higher) in the hierarchical tree structure.

As is known, the financial services industry, as well as other industries, are subject to a vast array of rules and regulations from a variety of regulatory agencies. Because of these rules and regulations, each broker dealer has an obligation to help ensure that all of its representatives follow all of the applicable rules and regulations. The hierarchical tree structure discussed above may help the broker dealer monitor the activities of its representatives, and in particular, those representative that fall within its responsibility. Thus, and in a preferred embodiment, the hierarchical tree may be structured and correspond to the responsibility assumed by each representative and firm.

Figure 4:
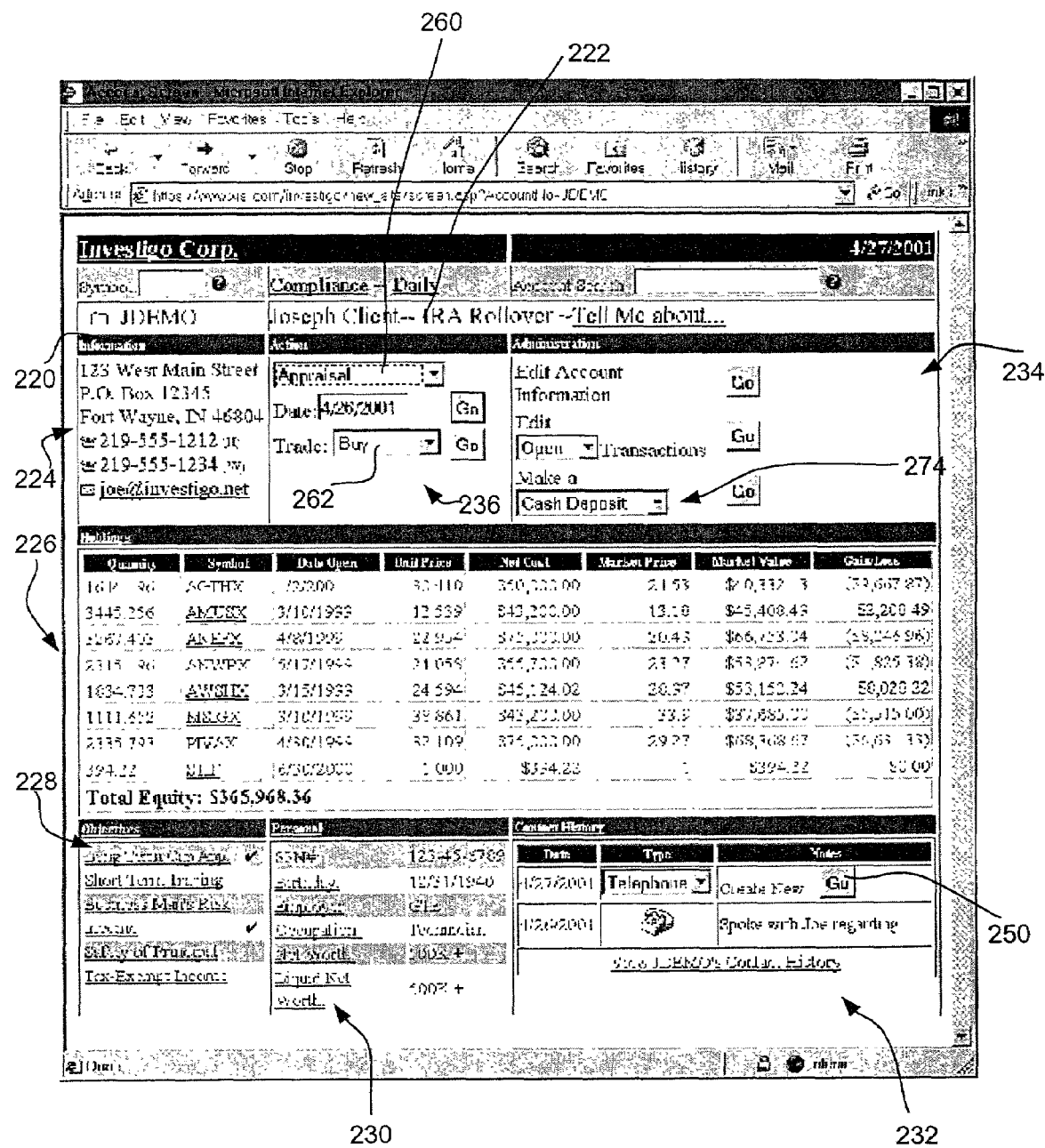
FIG. 4 is a screen shot showing an illustrative window that may be used by representatives of a firm to record his or her daily activities.

FIG. 4 is a screen shot showing an illustrative window that may be used by a representative to record his/her daily activities. The window shows the display after a particular customer account has been selected, namely customer account number "JDEMO". The illustrative window of FIG. 4 identifies the particular account at 220, the customer's name and the type of account at 222, the customer's address, phone number and email address at 224, the holdings in the account at 226, the customer's investment objectives at 228, certain personal information regarding the customer at 230, and recent contact history between the representative and the customer at 232. The window also includes an administrative section 234 and an action section 236, which are further described below.

The holding section 226 identifies the quantity, symbol, date opened, unit price, net cost, market price, market value, and gain/loss for each holding in the account. Also displayed is the total equity for the selected account. The investment objectives section 228 is set by the representative, preferably after having discussions with the customer. The investment objectives of the customer are important to keep in mind, and are thus readily available and viewable by the representative when the customers account is displayed. Often, decisions about future investments and investment strategies are evaluated in view of the customers investment objectives.

The personal information shown at 230 provides the representative with a high level snapshot of the customer and the customer's portfolio. The contact history section 232 is used to record the various contacts or discussions between the representative and the customer. This can be important, particularly during a regulatory audit of the firm. The full contact history between the representative and the customer can be displayed by simply selecting the "View JDEMO's contact history" hyperlink. A new entry in the contact history can be created by simply clicking on the Go button 250.

Figure 5:
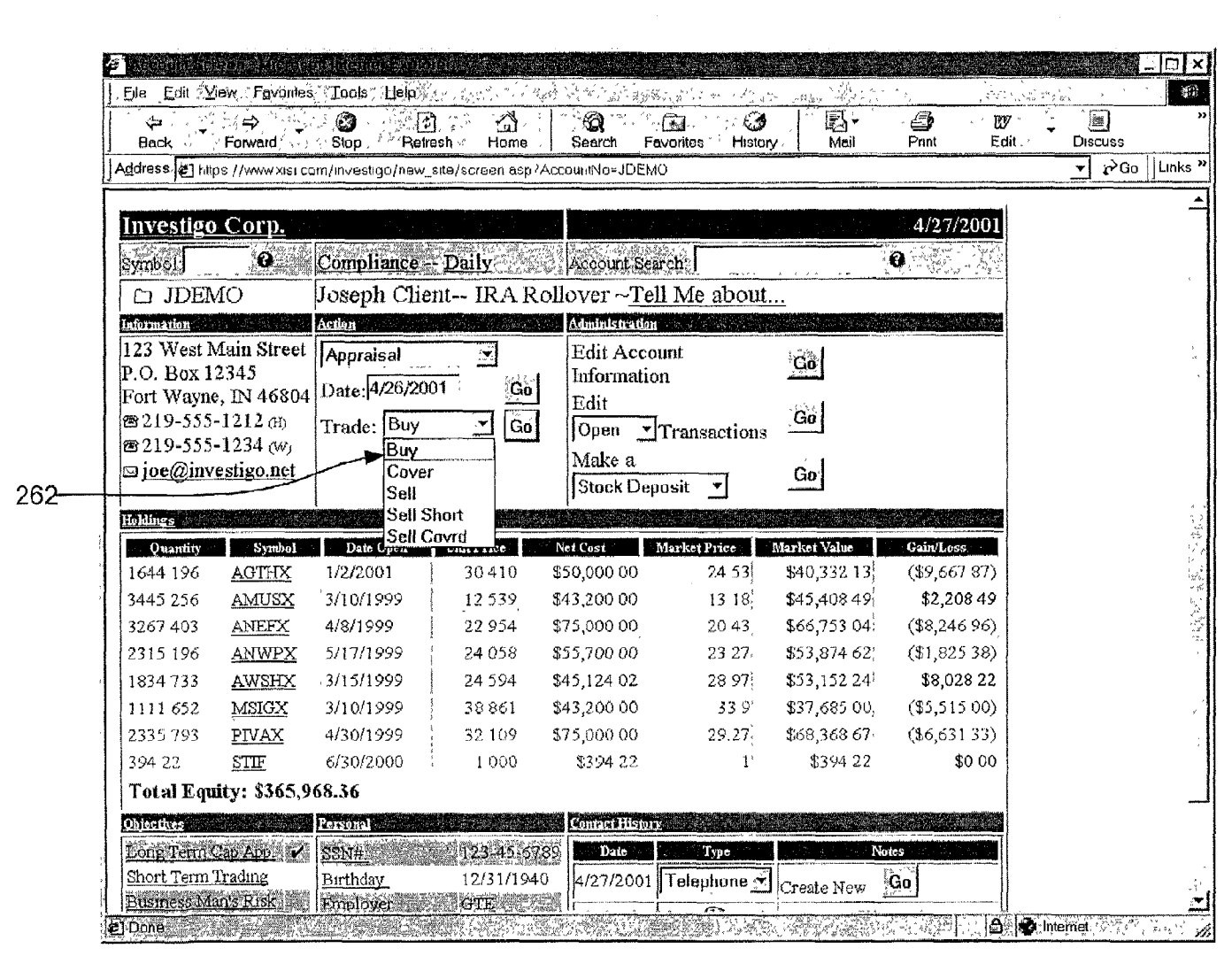

The administrative section 234 allows the representative to edit account information such as the customer's address or investment objectives. All changes are preferably time stamped for later reference. The administrative section 234 also allows the representative to edit an open transaction or to perform a number of tasks that are commonly encountered when dealing with customers, such as making a cash deposit. The action section 236 allows the representative to quickly generate various tables or graphs for the benefit of the customer. The action section 236 also includes a trade menu 262 for performing trades in the selected account. FIG. 5 is a screen shot showing the window of FIG. 4 with the trade menu 262 expanded. In the illustrative embodiment, the trade menu includes buy, cover, sell, sell short, and sell covered menu options.

Figure 6:
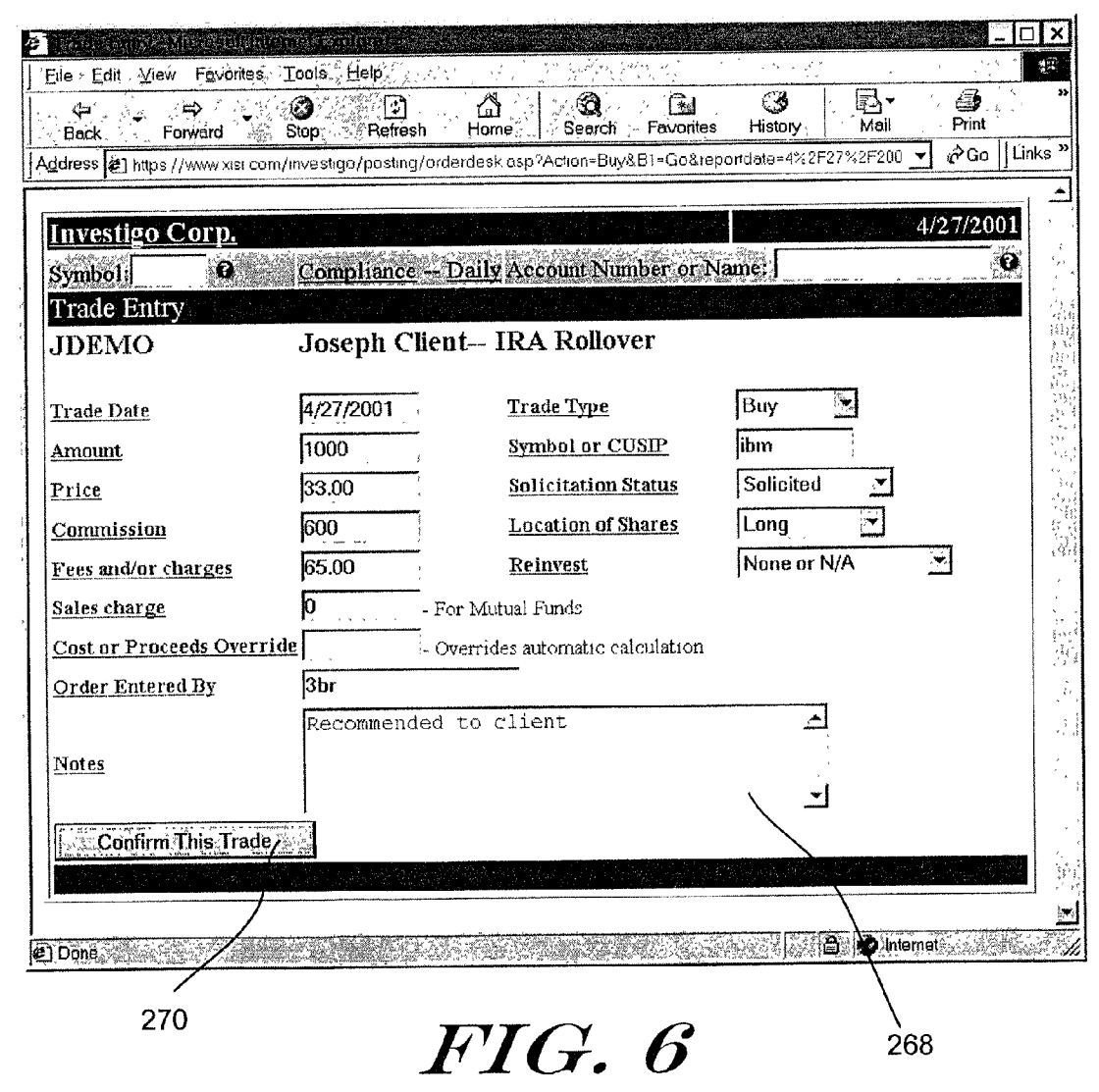

FIG. 6 is a screen shot of an illustrative window that may be displayed after the "Buy" menu option has been selected from the trade menu 262 of FIG. 5. The window shown in FIG. 6 accepts a number of fields from the representative. In the example shown, the window accepts a trade type, a symbol or CUSIP, a solicitation status, the location of the shares, a trade date, an amount or number or of shares, a price, etc. A notes section 268 is also provided, which allows the representative to record any notes that are pertinent to the trade. Once the representative fills in the appropriate fields, the representative hits the confirm this trade button 270. Once the representative hits the confirm trade button, the present invention may apply selected rules or procedures to the trade. For example, if the customer is purchasing the stock on margin, the present invention may apply rules or procedures to identify if the customer has enough margin to buy the specified quantity of stock. In another example, if the customer is selling a position, the present invention may apply rules or procedures to identify if the customer has sufficient shares to sell. In another example, the present invention may apply rules or procedures to determine if the particular stock is "Blue Sky" in the customer's state of residence. In yet another example, the present invention may apply rules or procedures to identify if the representative is licensed in the customer's state. It should be recognized that these are only illustrative, and many other rules or procedures can be used to generate reports or alerts and deliver the reports or alerts to the representative in real or near real time. In some embodiments, these reports or alerts may help the representative remain in compliance with the applicable rules and regulations.

It is contemplated that when a report or warning is delivered to the representative, as described above, an over-ride option may also be provided. This may allow the representative to perform the desired activity regardless of the report or alert. For example, if a customer hand delivers 100 shares of IBM stock, and want the representative to sell the shares, the present invention may provide an alert to the representative that the customer does not have sufficient shares of IBM to sell 100 shares, as these shares may not yet be recorded in the customer database. In this case, it would be appropriate for the representative to over-ride the report or alert and execute the trade. In some embodiments, a record of the over-ride may be recorded in the database for later reference.

FIG. 7 is a screen shot of an illustrative window that may be displayed after the "Confirm This Trade" button 270 of FIG. 6 has been selected. This window summarizes the information provided by the representative in FIG. 6. The representative reviews the displayed information and executes the order by selecting the "Execute this Buy Order" button 272. When the "Execute this Buy Order" button 272 is selected, the trade is executed and an entry is made in the firm's trade buy blotter 40.

FIG. 8 shows an illustrative Trades Buy Blotter that is preferably maintained by the system for all representatives of a firm. The Trade Buy Blotter includes buys that occurred between Oct. 1, 2000 to Oct. 31, 2000. The illustrative Trade Buy Blotter shows the trade date, the settle date, whether the trade was a buy or sell, the account number corresponding to each trade, the particular product or security that was traded, the number of shares traded, whether the trade was solicited or unsolicited by the representative, the buy price per share, the total buy cost, and the buy commission. Each buy entry shown in FIG. 8 is generated by the system when a representative executes a buy trade using the pull down menu shown in FIG. 5.

FIG. 9 shows an illustrative Daily Trade Tickets chart for all of the representatives of a firm. The Daily Trade Tickets chart shows all trade tickets that were issued between Oct. 1, 2000 and Oct. 31, 2000. The illustrative Daily Trade Tickets chart shows the trade date, the settle date, whether the trade was a buy or sell, the account number corresponding to each trade, the particular product or investment traded, the number of shares traded, whether the trade was solicited or unsolicited by the representative, the type of trade, the desired price, the report price, and the representatives for each trade.

The Trade Buy Blotter and the Daily Trade Tickets chart of FIGS. 8-9, respectively, are used to illustrative some of the ways that a system can record the activities of the representatives of a financial services firm. A further discussion this system can be found in co-pending U.S. patent application Ser. No. 09/917,447, filed Jul. 27, 2001, entitled "Methods And Systems For Assisting Financial Services Firms And Their Representatives", which is incorporated herein by reference.

Figure 10:
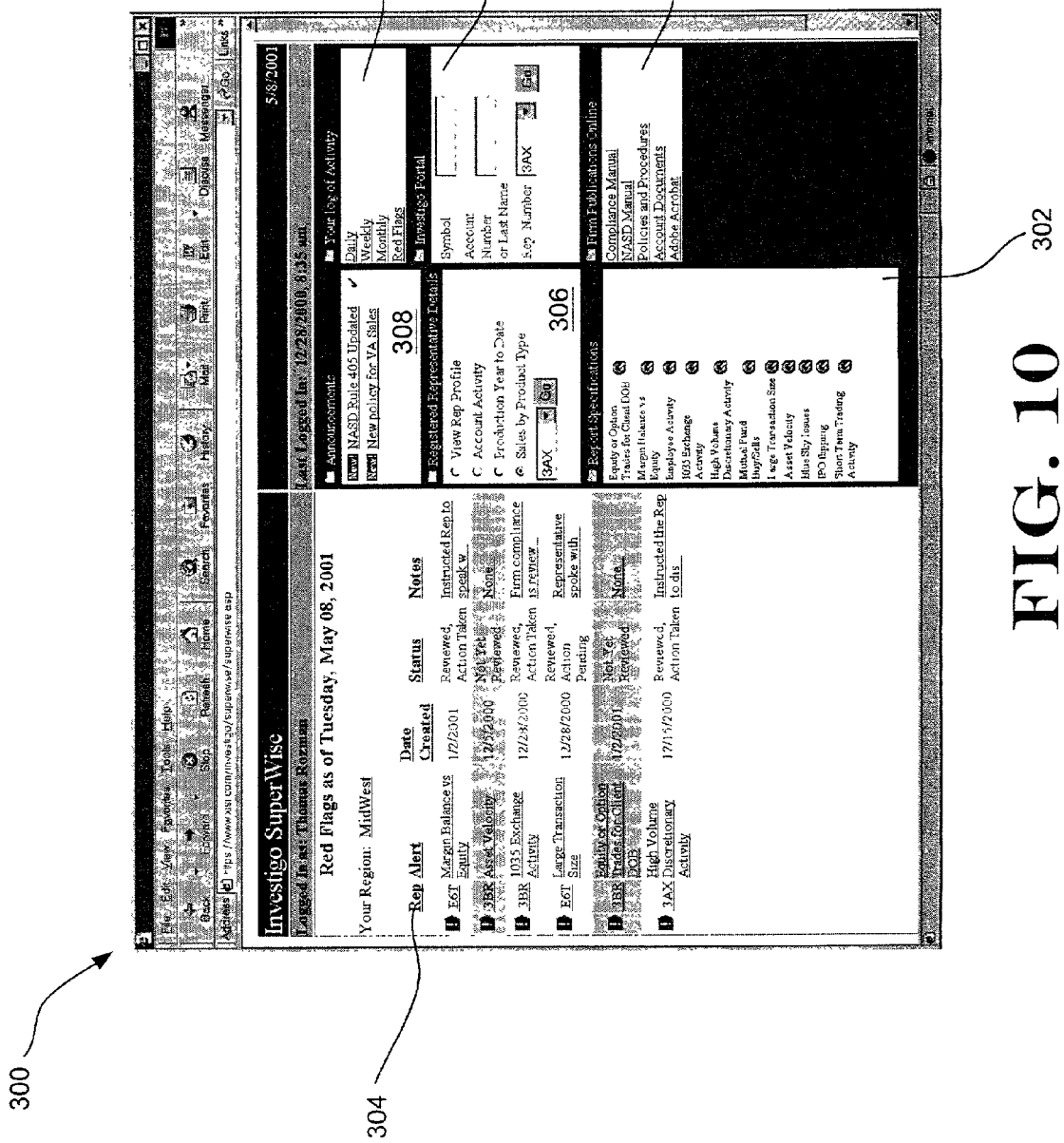
FIG. 10 is a screen shot of an illustrative window that may assist a supervisor in monitoring the activities of a number of representatives of a firm.

FIG. 10 is a screen shot of an illustrative window that may assist a supervisor in monitoring the activities of a number of representatives of a firm. The illustrative window is generally shown at 300, and includes a report specification region 302, a red flags region 304, a representative details region 306, an announcements region 308, an activity log region 310, an Investigo portal region 312 which enables efficient access to the customer database by a supervisor, and a firm publications region 314.

The report specification region 302 identifies the reports that are currently available to the supervisor or firm. Some of these reports may be defined by personnel of the firm, provided to the firm by outside vendors, or a combination thereof. In the illustrative window shown in FIG. 10, the report specification region 302 shows eleven reports including an "Equity or Option Trades for Client DOB" report, a "Margin Balance vs. Equity" report, an "Employee Activity" report, a "1035 Exchange" Report, a "High Volume Discretionary Activity" report, a "Mutual Fund Buy/Sells" report, a "Large Transaction Size" report, an "Asset Velocity" report, a "Blue Sky Issues" report, an "IPO Flipping" report, and a "Short Term Trading Activity" report. It should be recognized that these reports are only illustrative.

Each report preferably identifies one or more actual or potential unacceptable activity that may be performed by representatives of the firm. For example, the "Equity or Option Trades for Client DOB" report may identify all accounts that correspond to customers that have a date of birth (DOB) before a particular date (e.g. customer is above a certain age), and has more than "X" trades during a particular time period, where "X" is greater than zero. The trades may be equity or option trades in this example, and the results may be filtered depending on whether the trades were solicited or unsolicited by the representative. This report may be used by a supervisor to monitor and/or detect potential unacceptable activity relative to a firm's older customers.

Figure 11:
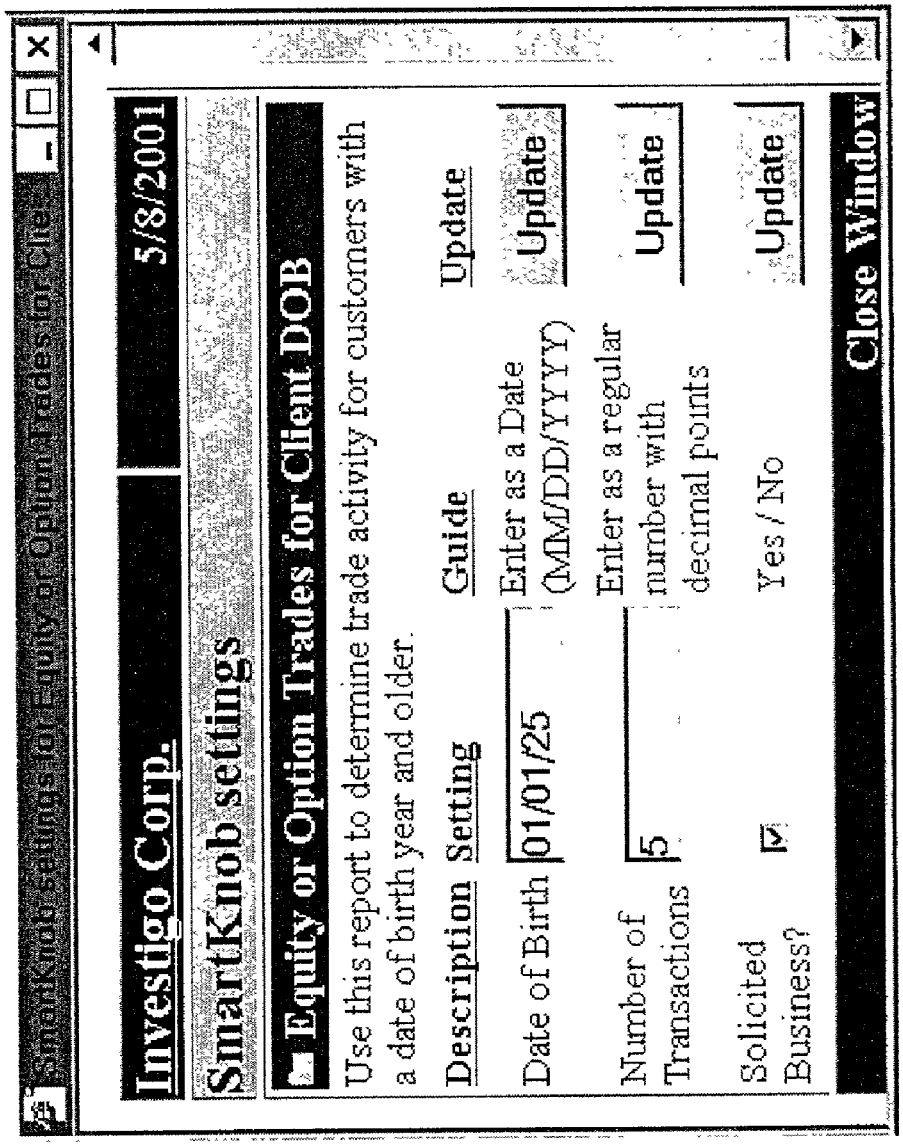
FIG. 11 is a screen shot showing illustrative parameters for an "Equity or Option Trades for Client Date of Birth" report.

Each report preferably defines one or more actual or potential unacceptable activity using one or more unacceptable activity parameters. In a preferred embodiment, some or all of the unacceptable activity parameters are changeable by the supervisor or supervising group. FIG. 11 is a screen shot showing some illustrative unacceptable activity parameters for the "Equity or Option Trades for Client Date of Birth" report discussed above. The illustrative unacceptable activity parameters include a Date of Birth, a number of transactions, and whether the trades were solicited or unsolicited by the representative. A supervisor or supervising group within the firm may change these parameters, as desired, by entering a new value into the appropriate dialog box and hitting the corresponding "update" button. In addition, a supervisor or supervising group within the firm may add or remove parameters, or define different reports, as desired. This may give the firm added flexibility in defining and identifying unacceptable activity within the firm.

The other reports shown in the report specification region 302 of FIG. 10 may define other actual or potential unacceptable activity within the firm. In the illustrative embodiment, the "Margin Balance vs. Equity" report may be used to detect those accounts that have an excessive margin balance relative to total equity. FIG. 12 is a screen shot showing some illustrative parameters for the "Margin Balance versus Equity" report. These illustrative parameters include a margin balance percentage, and whether the representative has a discretionary agreement with the customer. A supervisor or supervising group within the firm may change these parameters, as desired, by entering a new value into the appropriate dialog box and hitting the corresponding "update" button, as described above.

Figure 13:
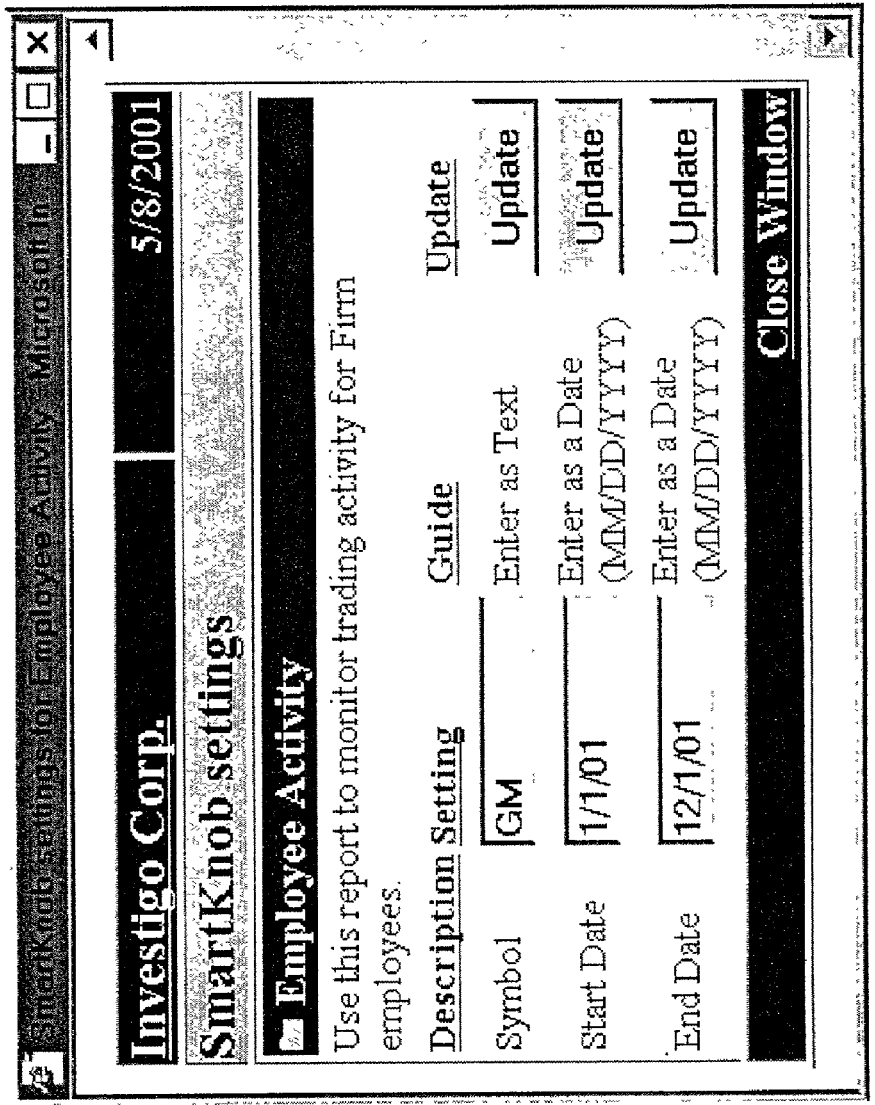
FIG. 13 is a screen shot showing illustrative parameters for an "Employee Activity" report.
Figure 14:
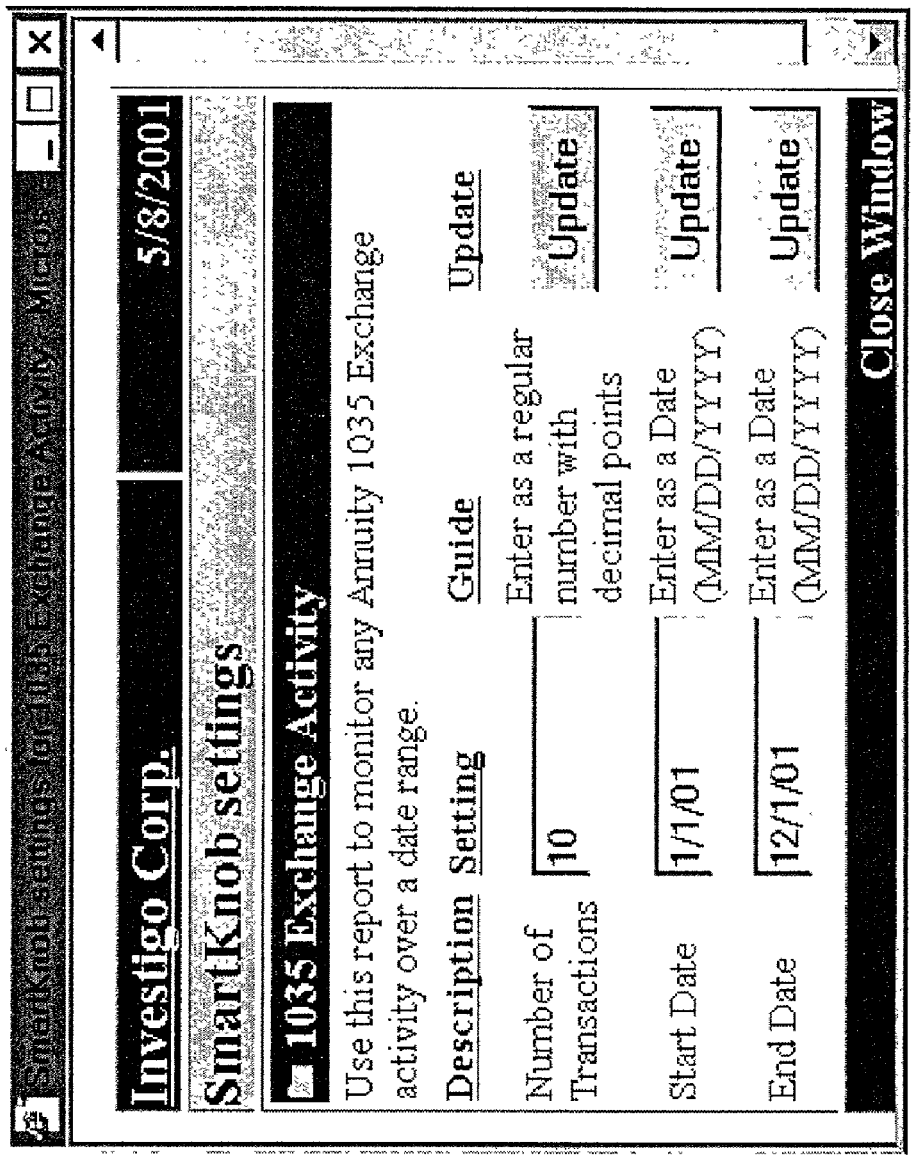
FIG. 14 is a screen shot showing illustrative parameters for a "1035 Exchange Activity" report.
Figure 15:
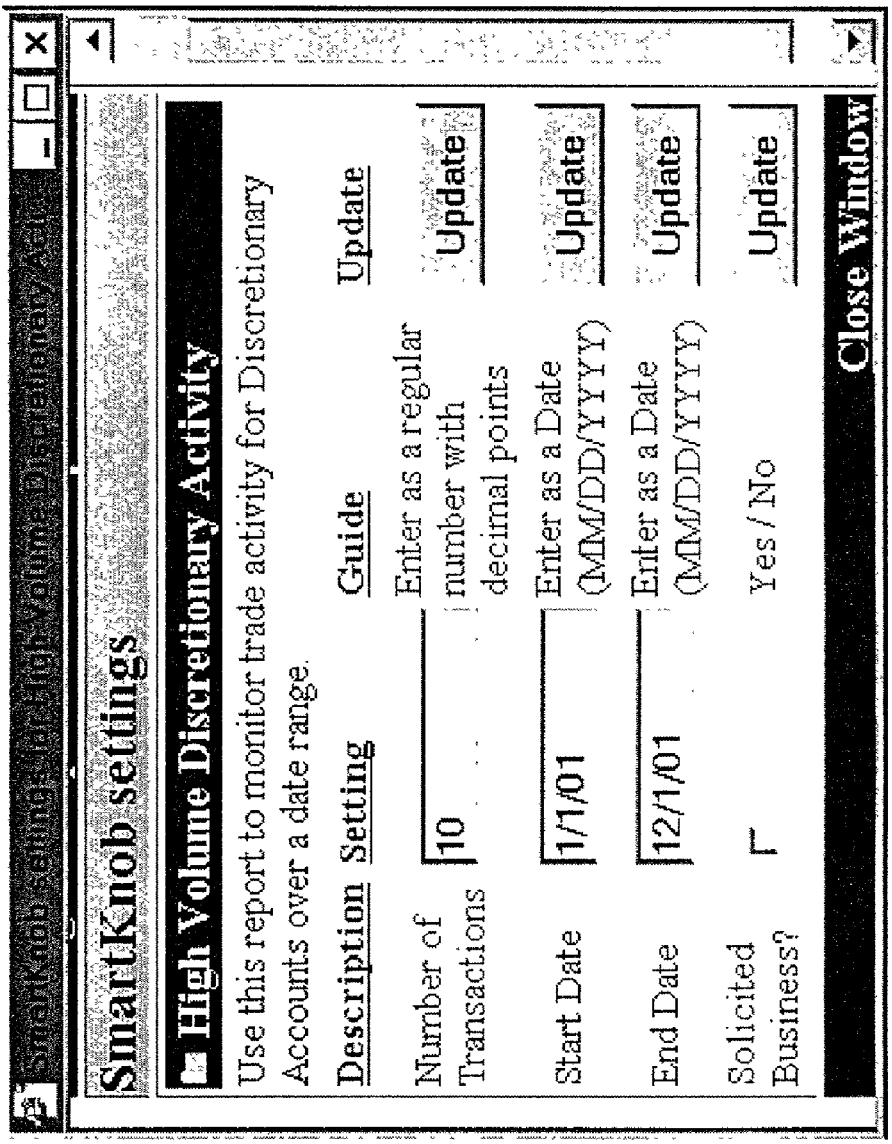
FIG. 15 is a screen shot showing illustrative parameters for a "High Volume Discretionary Activity" report.

The "Employee Activity" report in the report specification region 302 of FIG. 10 may be used to detect excessive trading activity by firm employees in a particular stock. FIG. 13 is a screen shot showing some illustrative parameters for the "Employee Activity" report. These illustrative parameters include the symbol of the particular stock, as well as a date range. The "1035 Exchange" Report may be used to detect excessive Annuity 1035 Exchange activity. FIG. 14 is a screen shot showing some illustrative parameters for the "1035 Exchange Activity" report. These illustrative parameters include the number of 1035 transactions and a date range. The "High Volume Discretionary Activity" report may be used to detect excessive trade activity for accounts that are designated as discretionary. FIG. 15 is a screen shot showing some illustrative parameters for the "High Volume Discretionary Activity" report. These illustrative parameters include the number of transactions, a date range, and whether the business was solicited or unsolicited. The "Mutual Fund Buy/Sells" report, "Large Transaction Size" report, "Asset Velocity" report, "Blue Sky Issues" report, "IPO Flipping" report, and the "Short Term Trading Activity" report are just a few other examples of reports that can be defined and used. Other reports may include, for example, a report that identifies those representatives that are the subject of more than, for example, five reports during a 30 day period.

Once the various reports have been defined and the unacceptable activity parameters set, each report (or subset of reports) may be run against the database 30 (see FIG. 2). It is contemplated the all or some of the reports may be run against the database when, for example, prompted by a supervisor or when a representative uses a particular function such as a stock buy function. Alternatively, or in addition, some or all of the reports may be run automatically in a batch mode at some desired frequency interval including up to real or near real time. Under some circumstances, it may be desirable to run some or all of the reports in batch mode during off-peak hours, which may reduce the load on the database 30 during ordinary business hours.

When run, the unacceptable activity parameters are compared against the activities and/or data recorded in the database 30. An alert is then displayed in the red flags region 304 of FIG. 10 for each of the activities that falls within the unacceptable activity parameters of the reports. Activities that do not fall within the unacceptable activity parameters are preferably not reported or displayed, thereby eliminating much of the clutter that might otherwise exist. The listing of alerts may be stored in the database 30 for later reference, if desired.

Each alert in the red flag region 304 preferably identifies selected high level information that might be of interest to a supervisor when reviewing the alerts. In the illustrative embodiment, each alert displays the representative that is associated with the activity, a description of the alert which in the embodiment shown corresponds to the title of the report that identified the activity, the date of the alert, the current status of the alert, and any notes that have been recorded for the alert.

Figure 18:
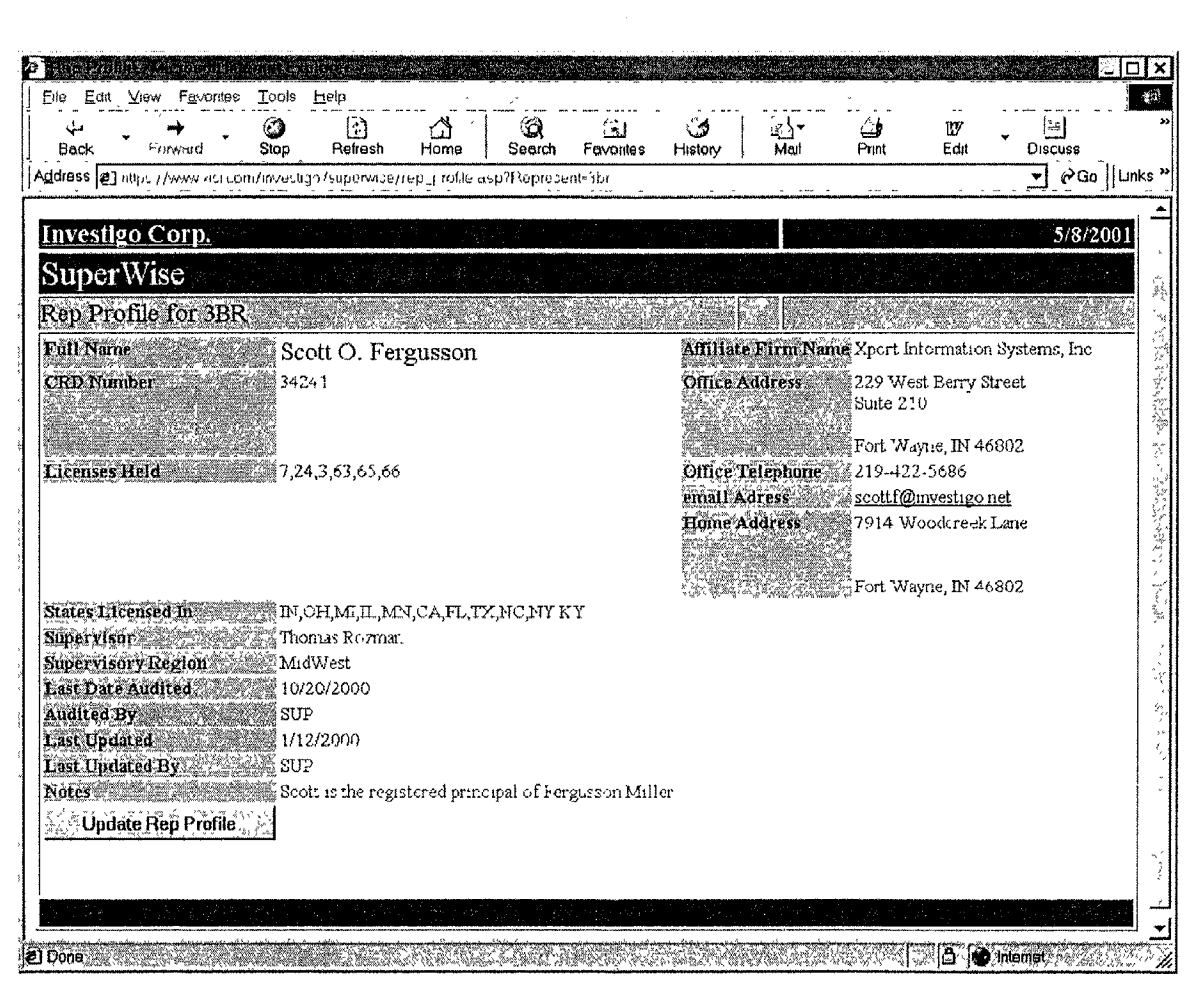

Some of the information provided in the alert may be in the form of a hyperlink. For example, the representative identifier (e.g. "3BR") shown in the second to last alert of FIG. 10 may be in the form of a hyperlink, which when selected, may display a representative profile for the representative "3BR". One such representative profile is shown in FIG. 18, and it includes the representatives name, address, affiliate firm, licensure information, as well as other information. Although not shown, a log of questionable activity may be maintained for each representative, and displayed in the representative profile if desired. This may help a supervisor or the like identify those representatives that are more likely to be involved in unacceptable activity. The log itself may be searched to identify, for example, all representatives that have been the subject of more than five (5) alerts in the past year.

The description of the alert may also be in the form of a hyperlink. For example, the description of the alert "Equity or Option Trades for Client DOB" shown in the second to last alert may be in the form of a hyperlink, which when selected, may display the accounts of representative "3BR" that meet the unacceptable activity parameters of the "Equity or Option Trades for Client DOB" report shown in FIG. 11.

From the listing of alerts, a supervisor or the like may review and perform appropriate follow up activity, as desired. The supervisor preferably records his or her follow up activity in the database in the "notes" field. The "notes" field for each alert may also be in the form of a hyperlink, as shown. In the example shown, the notes field for the alert "Equity or Option Trades for Client DOB" is in the form of a hyperlink, which when selected, displays the notes that have been recorded, if any. For the "Equity or Option Trades for Client DOB" alert of FIG. 10, the default phrase "None" is displayed in the notes field. After following up on the "Equity or Option Trades for Client DOB" alert, however, the supervisor may click on the "None" hyperlink to add a note to the notes column.

Figure 16:
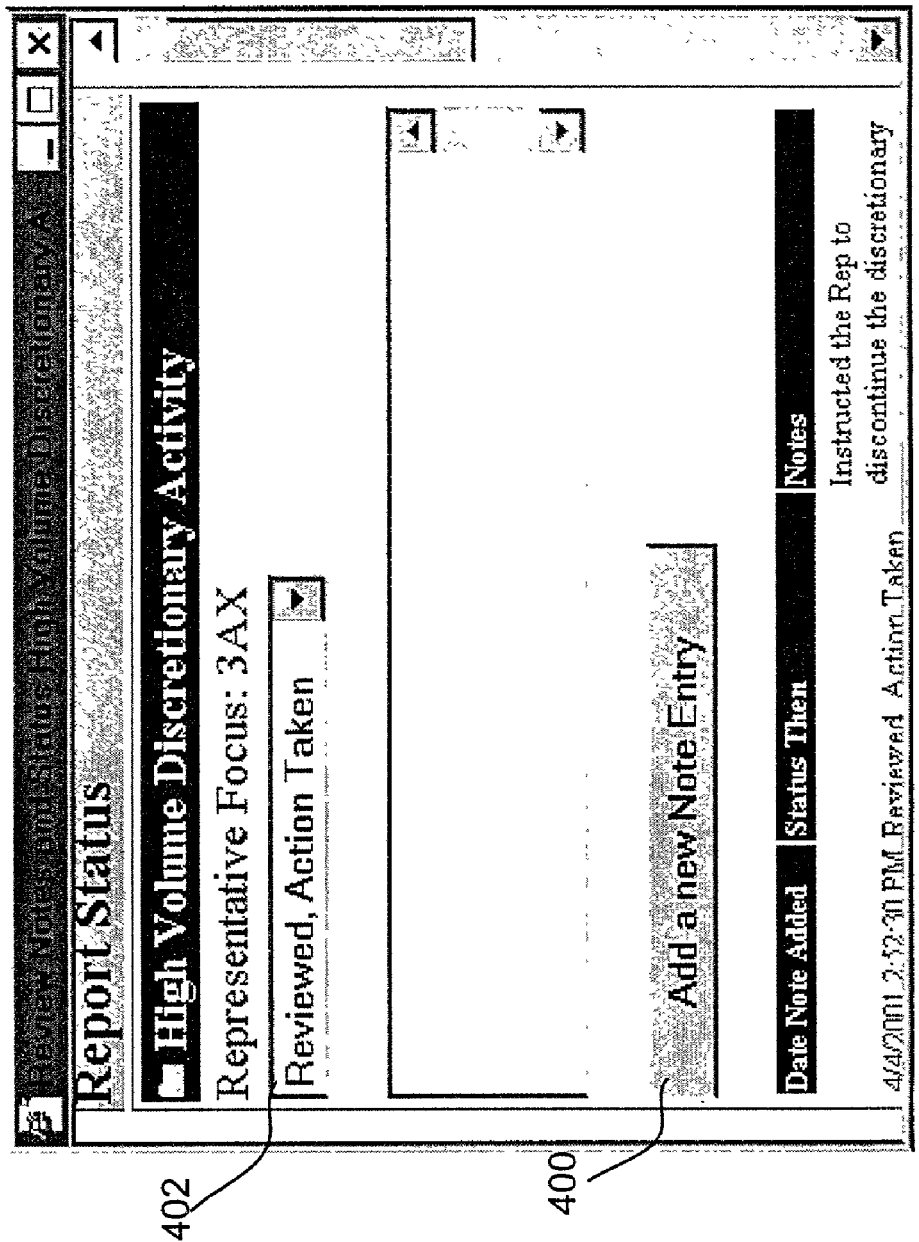
FIG. 16 is a screen shot showing an illustrative window that may be displayed when the hyperlink under the notes column for the "High Volume Discretionary Activity" alert is selected in FIG. 10.
Figure 17:
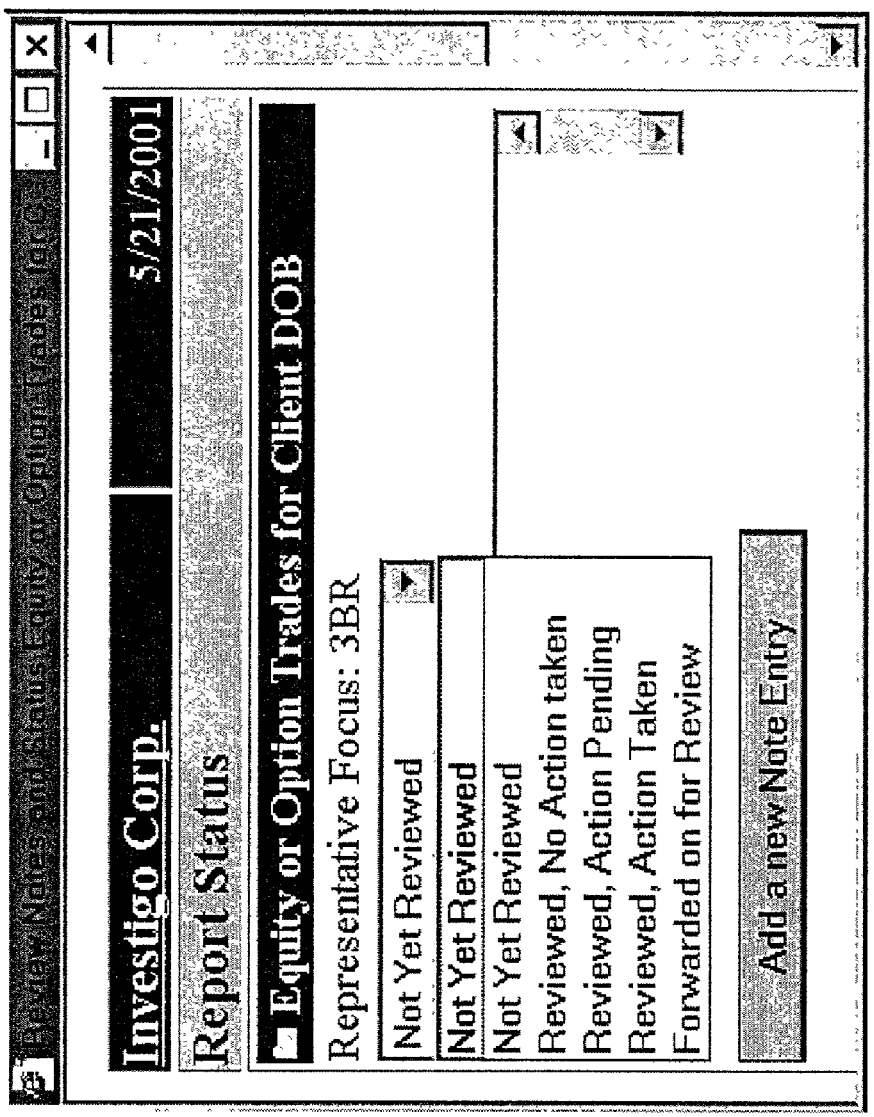
FIG. 17 is a screen shot showing an illustrative window that may be displayed when the hyperlink under the notes column for the "Equity or Option Trades for Client Date of Birth" alert is selected in FIG. 10.

The "High Volume Discretionary Activity" alert of FIG. 10 already has a note added to the notes column. Another note may be added to the notes column by clicking on the last note, or in this example, the "Instructed the Rep to dis . . . " hyperlink. When the last note is selected, the notes dialog box shown in FIG. 16 is preferably displayed. The notes dialog box allows a supervisor to add another note by selecting the "Add a new Note Entry" button 400. The add noted dialog box also preferably allows a supervisor to change the status of an alert, by selecting a new status from the status pull down menu 402. FIG. 17 shows the notes dialog box for the "Equity or Option Trades for Client DOB" alert of FIG. 10, with the "status" pull down menu expanded.

Initially, the status of each alert is set to "Not Yet Reviewed" as the default value. When the status of an alert is still "Not Yet Reviewed", the alert is highlighted in a designated color (shown shaded in FIG. 10) in the red flags region 304 of FIG. 10. This allows the supervisor to immediately identify those alerts that have not yet been reviewed. After the alert is reviewed, the supervisor preferably changes the status of the alert to one of a number of other status categories. As shown in FIG. 17, the status of an alert may be changed to "Reviewed, No Action taken", "Reviewed, Action Pending", "Reviewed, Action Taken", and "Forwarded on for Review". Once the status of an alert is changed from "Not Yet Reviewed", the alert is no longer highlighted in the designated color in the red flag region 304 of FIG. 10.

In addition to the reports discussed above, FIG. 10 also provides access to information that may allow a supervisor to proactively check for various compliance issues. For example, when a supervisor clicks on a hyperlink corresponding to a representative, or selects the view rep profile button, the representative profile may be displayed, as shown in FIG. 18. The representative profile may show the states in which the representative is licensed. The supervisor may check for trade activity that is conducted in states outside of the representatives licensed states. If desired, reports may be defined to detect these and other compliance issues.

The activity log region 310 of FIG. 10 allows a supervisor to assemble and view all alerts that generated a red flag, as well as all follow up activity, during the specified time period. For example, by clicking on the "Weekly" hyperlink in the activity log region 310, the supervisor may view all alerts that generated a red flag, as well as all follow up activity, that occurred during the past week. In addition, it is contemplated that a search function may be provided, allowing the supervisor to identifying selected alerts. The search function may include one or more fields for searching by, for example, all alerts associated with designated representative, all alerts that relate to short term trading, etc.

The a firm publications region 314 preferably allows a supervisor to view compliance related materials. In the illustrative embodiment, hyperlinks are provided to a firm compliance manual, an NASD manual, a policy and procedures document, and an account document. Other compliance related materials may also be included. The supervisor may access any of the compliance related materials by simply clicking on the appropriate hyperlink. Preferably, the system records when each supervisor views or accesses the compliance related materials.

Rather than defining one or more actual or potentially unacceptable activities using the unacceptable activity parameters, it is contemplated that the various reports may include one or more acceptable activity parameters. Once defined, each report may be run against the database 30 to compare the acceptable activity parameters against the recorded activities in the database 30. Like above, a listing of alerts may be generated, each identifying only those activities recorded in the database that fall outside of the acceptable activity parameters defined in the reports.

As noted above with respect to FIG. 3, some industries have a hierarchical structure or form. To support this structure, it is contemplated that the present invention may allow each supervisor to create his/her own reports, and/or maintain his/her unique report parameters. This may allow each supervisor to monitor different activities or provide different alert levels, as desired.

Figure 19:
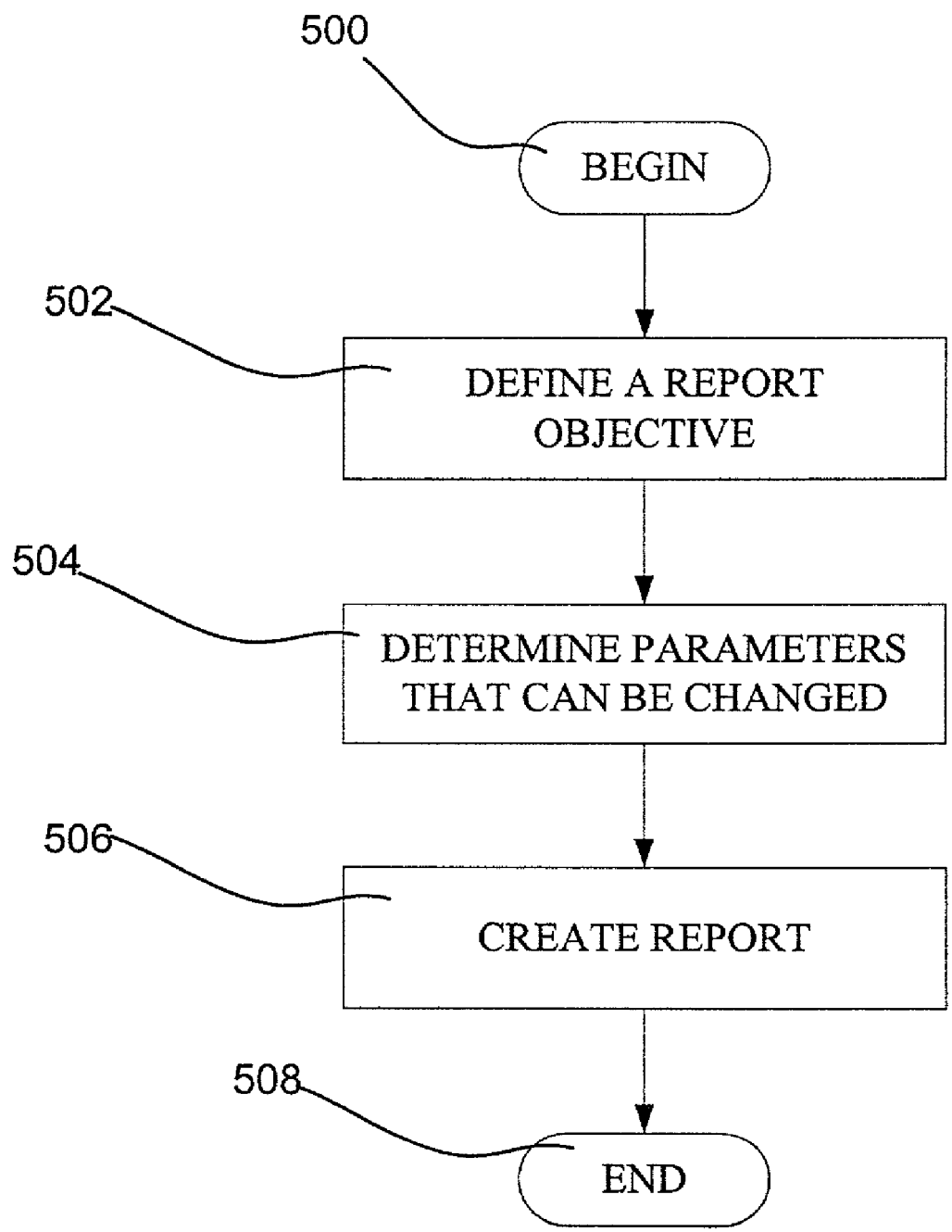
FIG. 19 is a flow chart showing an illustrative method for defining a report in accordance with the present invention.

FIG. 19 is a flow chart showing an illustrative method for defining a report in accordance with the present invention. The method is entered at step 500, wherein control is passed to step 502. Step 502 defines a report objective. The report objective preferably identifies at least some form of unacceptable activity. Once the report objective is defined, one or more unacceptable activity parameters are defined, as shown at step 504. The unacceptable activity parameters are preferably chosen so that the unacceptable activity identified in the report objective of step 502 can be identified by comparing the unacceptable activity parameters against recorded activities in the database 30. At least some of the unacceptable activity parameters may be changeable by the user, as desired. Once the unacceptable activity parameters are defined, a corresponding report is created, as shown at step 506.

Figure 20:
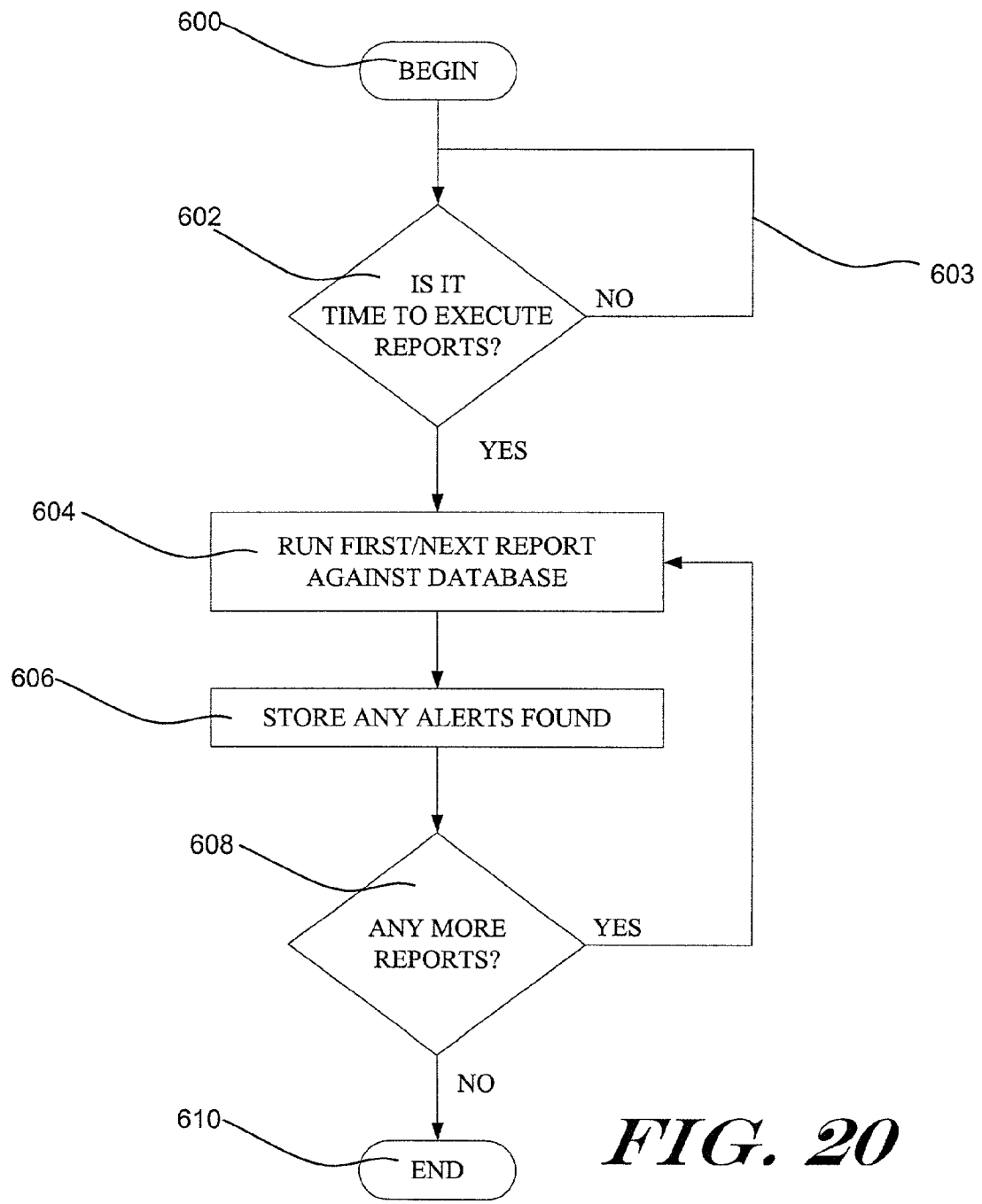
FIG. 20 is a flow chart showing an illustrative method for executing the reports.

FIG. 20 is a flow chart showing an illustrative method for executing the reports created in FIG. 19. The method is entered at step 600, and control is passed to step 602. Step 602 determines if it is time to execute the reports. As indicated above, it is contemplated the all or some of the reports may be run against the database when, for example, prompted by a supervisor or when a representative uses a particular function such as a stock buy function. Alternatively, or in addition, some or all of the reports may be run automatically in a batch mode at some desired frequency interval including up to real or near real time. Under some circumstances, it may be desirable to run some or all of the reports in batch mode during off-peak hours, which may reduce the load on the database 30 during ordinary business hours.

If it is not yet time to execute the reports, control is passed back to step 602, as shown at 603. If it is time to execute the reports, control is passed to step 604. Step 604 runs a first/next report against the database 30. Step 606 stores any alerts found by the first/next report. Step 608 determines if there are any more reports to run. If there are more reports to run, control is passed back to step 604. If there are no more reports to run, control is passed to step 610, wherein the algorithm is exited. While the flow chart of FIG. 20 illustrates the serial execution of the various reports, parallel execution may also be used, as desired.

Figure 21:
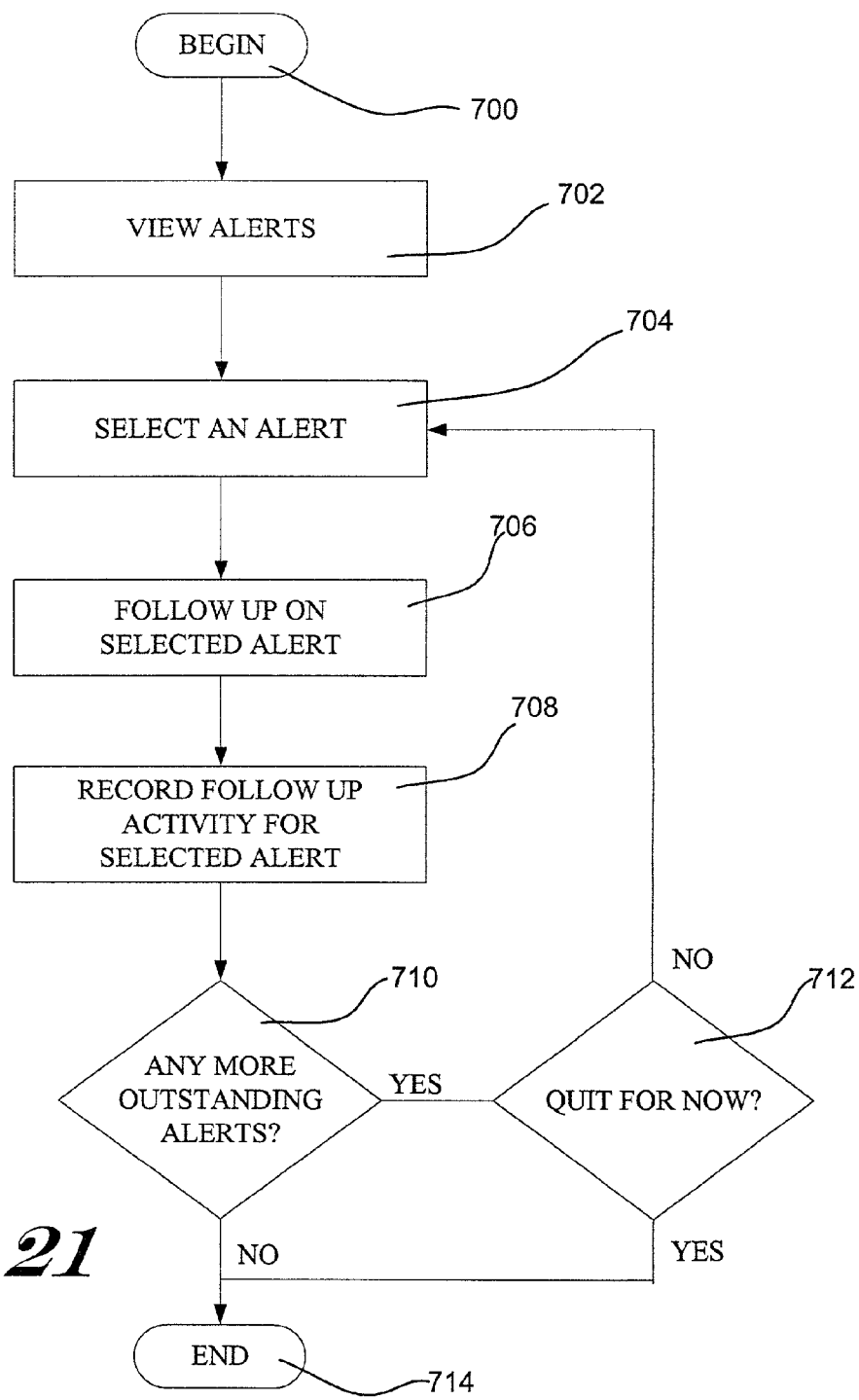
FIG. 21 is a flow chart showing an illustrative method for viewing and following up on alerts identified by reports.

FIG. 21 is a flow chart showing an illustrative method for viewing and following up on alerts identified by the reports of FIG. 20. The method is entered at step 700, wherein control is passed to step 702. Step 702 allows a user to view a number of alerts, preferably those alerts generated by executing the reports in accordance with FIG. 20. Step 704 allows the user to select one of the alerts. Step 706 allows the user to follow up on the selected alert, and step 708 allows the user to record any follow up activity that relates to the selected alert. Step 710 determines of there are any more outstanding alerts. If there are no more outstanding alerts, control is passed to step 714, wherein the algorithm is exited. If there are more outstanding alerts, control is passed to step 712. Step 712 determines if the user wants to continue or quit. If the user wants to continue, control is passed back to step 704. If the user want to quit, control is passed to step 714, wherein the algorithm is exited.

Figure 22:
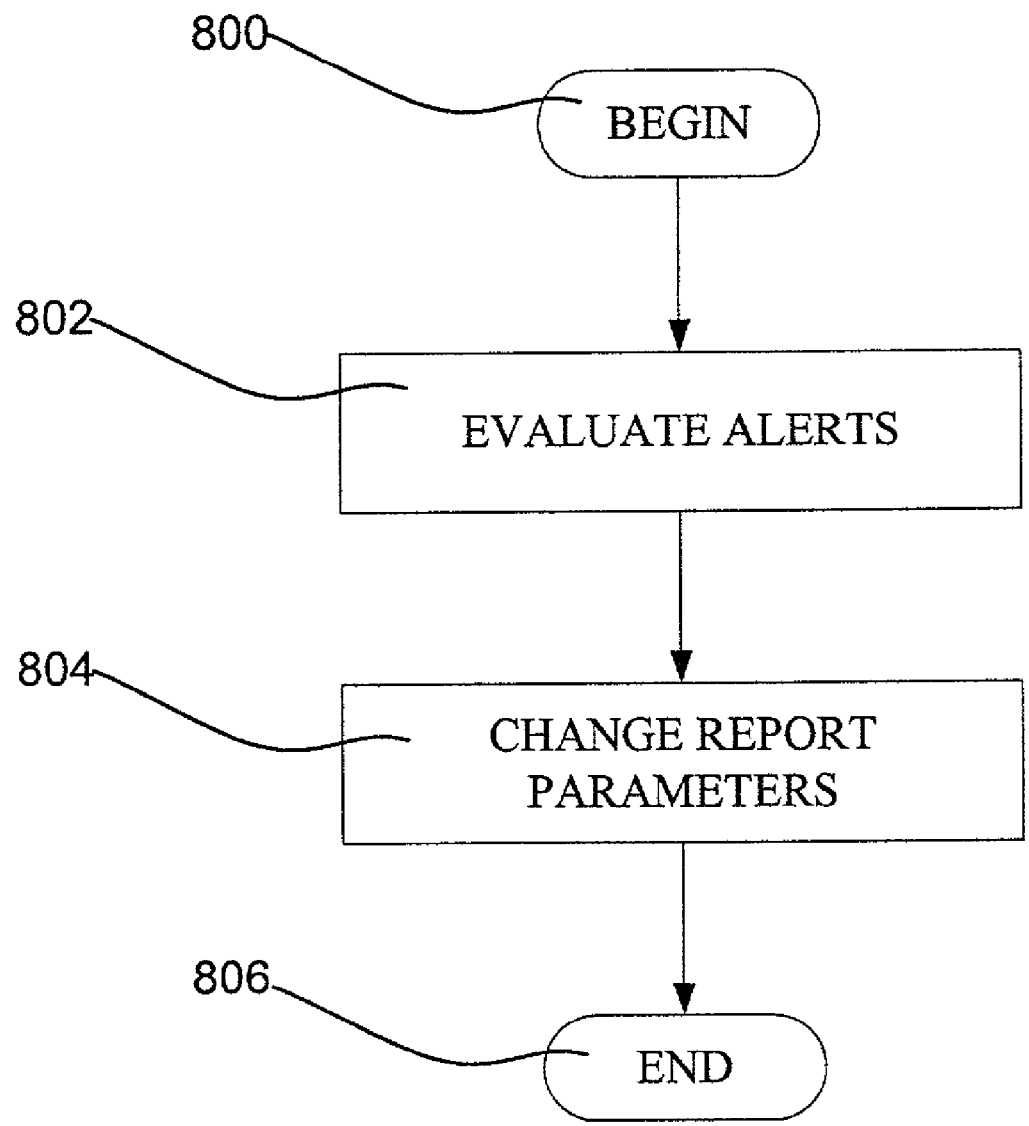
FIG. 22 is a flow chart showing an illustrative method for changing the activity that is flagged by adjusting selected parameters in one or more of the reports.

FIG. 22 is a flow chart showing an illustrative method for changing the activity that is flagged by various reports by adjusting selected parameters in one or more of the reports. The method is entered at step 800, and control is passed to step 802. Step 802 allows a user to evaluate a number of alerts that are generated by a number of reports. At least some of the reports preferably have one or more report parameters, and in a preferred embodiment, one or more unacceptable activity parameters. Step 804 allows the user to change selected report parameters. This can be accomplished by, for example, using one of the "update" buttons of FIGS. 11-15 described above. By allowing some or all of the unacceptable activity parameters to be changed by the supervisor or the like, more flexibility can be realized in defining and identifying unacceptable activity within a firm or organization.

Having thus described the preferred embodiments of the present invention, those of skill in the art will readily appreciate that the teachings found herein may be applied to yet other embodiments within the scope of the claims hereto attached.

What is claimed is:

1. A computer implemented method for providing supervision over the activities of a number of representatives of a financial services firm, the method comprising the steps of:
   providing a data processing system including at least one database;
   each of the number of representatives recording his/her activities in the at least one database by communicating with the data processing system via a user interface;
   the data processing system storing a number of reports in the at least one database, each report defining a number of unacceptable activity parameters, regarding at least one rule or regulation of the financial service firm;
   wherein the unacceptable activity parameters include a date of birth parameter and a number of trades parameter;
   wherein the date of birth parameter and the number of trades parameter are changed by the supervisor;
   the data processing system running the number of reports against at least part of the at least one database, for each report the data processing system checking the recorded activities of each representative against the number of unacceptable activity parameters defined in the report;
   wherein the data processing system, with a computer for providing an alert for each customer that has a date of birth on or before the date of birth parameter and has a number of trades that exceeds the number of trades parameter; and
   the data processing system creating a listing of alerts for only those activities in the at least one database that fall within the unacceptable activity parameters defined in the number of reports.

2. A method according to claim 1, wherein the number of unacceptable activity parameters is changed by a user or representative charged with the supervision of the activities of the number of representatives.

3. A method according to claim 1, wherein the data processing system runs selected reports against the at least one database in a batch mode during off peak hours.

4. A method according to claim 1, wherein the data processing system runs selected reports against the at least one database at a preset interval.

5. A method according to claim 1, wherein the data processing system runs selected reports against the at least one database when a representative performs a predetermined function.

6. A method according to claim 1, further comprising the data processing system storing the listing of alerts in the at least one database.

7. A method according to claim 6, further comprising the steps of:
   performing follow up activity for selected alerts; and
   recording the follow up activity for the selected alerts in the at least one database.

8. A method according to claim 1, further comprising the data processing system assembling a listing of alerts that were generated during a predetermined previous time period.

9. A method according to claim 1, further comprising the data processing system identifying selected alerts using a search function.

10. A method according to claim 1, further comprising the step of providing compliance related materials to a user.

11. A method according to claim 10, further comprising the data processing system recording when the user views or accesses the compliance related materials in the at least one database.

12. A method according to claim 1, further comprising the step of accessing one or more entries in the at least one database that correspond to a selected alert.

13. A method according to claim 1, wherein the listing of alerts includes an alert that corresponds to an activity other than neglecting to enter one or more data fields in a customer account.

14. A computer implemented method for creating a report used by a supervisor for supervising the activities of a number of representatives of a financial services firm, the method comprising:

provforming a data processing system including at least one database;

each of the number of representatives recording his/her activities in the at least one database by communicating with the data processing system with the aid of a user interface;

defining one or more unacceptable activity parameters for detecting the one or more unacceptable activities with the aid of a user interface that is in communication with the data processing system;

wherein the unacceptable activity parameters include a date of birth parameter and a number of trades parameter;

wherein the date of birth parameter and the number of trades parameter are changed by the supervisor;

storing the defined one or more unacceptable activity parameters, regarding at least one rule or regulation of the financial service firm, in the at least one database;

the data processing system indicating which of the unacceptable activity parameters to be changed by the supervisor, resulting in one or more changeable unacceptable activity parameters;

wherein the data processing system provides, with a computer, an alert for each customer that has a date of birth on or before the date of birth parameter and has a number of trades that exceeds the number of trades parameter; and the data processing system, with a computer, for generating a report, the report including the one or more unacceptable activity parameters including one or more of the changeable unacceptable activity parameters.

15. A method according to claim 14, wherein the data processing system runs the report against the at least one database and provides an alert for those activities in the at least one database that fall within the unacceptable activity parameters defined in the report.

16. A method according to claim 14, wherein the representatives are brokers.

17. A method according to claim 16, wherein the at least one database includes account data for a number of customers of the financial services firm, the account data including the date of birth of the customers.

18. A method according to claim 16, wherein one of the unacceptable activities is having a margin balance that is too large relative to a customer's equity value.

19. A method according to claim 16, wherein one of the unacceptable activities is having too many Annuity 1035 Exchange transactions over a specified period of time.

20. A method according to claim 16, wherein one of the unacceptable activities is having too much trade activity in discretionary accounts.

21. A method according to claim 16, wherein one of the unacceptable activities is having too many unacceptable activities in a predetermined time period.

22. A method according to claim 21, wherein the data processing system provides an alert for those activities in the at least one database that fall outside of the acceptable activity parameters defined in the report.

23. A method according to claim 17, wherein one of the activities recorded by each representative is each trade made by the representative on behalf of a customer.

24. A method according to claim 23, wherein one of the unacceptable activities is too much trading by older customers.

25. A computer implemented method for providing a report used by a supervisor for supervising the activities of a number of representatives of a financial services firm, the method comprising:

accessing a data processing system including at least one database;

each of the number of representatives recording his/her activities in the at least one database by communicating with the data processing system with the aid of a user interface;

identifying one or more acceptable activities, regarding at least one rule or regulation of the financial service firm;

defining one or more acceptable activity parameters for detecting the one or more acceptable activities with the aid of a user interface that is in communication with the data processing system;

wherein the acceptable activity parameters include a date of birth parameter and a number of trades parameter;

wherein the date of birth parameter and the number of trades parameter are changed by the supervisor;

storing the defined one or more acceptable activity parameters in the at least one database;

the data processing system marking those acceptable activity parameters that are changeable by the supervisor, resulting in one or more changeable acceptable activity parameters;

wherein the data processing system provides, with a computer, an alert for each customer that has a date of birth on or before the date of birth parameter and has a number of trades that exceeds the number of trades parameter; and the data processing system generating a report, the report including the one or more acceptable activity parameters including one or more of the changeable acceptable activity parameters.

* * * * *